US008799385B2

(12) United States Patent
Majeti et al.

(10) Patent No.: US 8,799,385 B2
(45) Date of Patent: *Aug. 5, 2014

(54) DELIVERY CONTROL FOR EMAIL COMMUNICATED AMONG MULTIPLE END USER COMMUNICATION DEVICES

(75) Inventors: Venkata C. Majeti, Naperville, IL (US); Sri Sharmila Sripada, Naperville, IL (US); Madhur Mohan Vyas, Rajasthan (IN); Simon W. Zhang, Naperville, IL (US)

(73) Assignee: Loment, Inc., Naperville, IL (US)

( * ) Notice: Subject to any disclaimer, the term of this patent is extended or adjusted under 35 U.S.C. 154(b) by 35 days.

This patent is subject to a terminal disclaimer.

(21) Appl. No.: 13/526,663

(22) Filed: Jun. 19, 2012

(65) Prior Publication Data

US 2013/0151636 A1    Jun. 13, 2013

Related U.S. Application Data

(63) Continuation-in-part of application No. 13/199,307, filed on Aug. 25, 2011, which is a continuation-in-part of application No. 13/134,591, filed on Jun. 10, 2011, which is a continuation-in-part of application No. 13/068,340, filed on May 9, 2011, which is a continuation-in-part of application No. 13/065,839, filed on Mar. 31, 2011.

(51) Int. Cl.
*G06F 15/16* (2006.01)
*H04L 12/58* (2006.01)
*G06Q 10/10* (2012.01)

(52) U.S. Cl.
CPC ............. *H04L 51/04* (2013.01); *H04L 12/5875* (2013.01); *H04L 12/5805* (2013.01); *H04L 12/589* (2013.01); *H04L 51/30* (2013.01); *G06Q 10/107* (2013.01); *H04L 51/18* (2013.01); *H04L 51/38* (2013.01)
USPC ........................................... 709/206; 709/207

(58) Field of Classification Search
CPC .......... H04N 1/00209; H04N 1/00217; H04L 12/58; H04L 12/5805; H04L 12/5875; H04L 12/589; H04L 41/509; H04L 51/00; H04L 51/02; H04L 51/30; H04M 1/72552
USPC ............ 709/206, 207; 716/4; 455/404.2, 466; 715/779; 713/154; 380/259; 714/2; 707/705
See application file for complete search history.

(56) References Cited

U.S. PATENT DOCUMENTS

2007/0136430 A1* 6/2007 Qureshi et al. ................. 709/206
2009/0265308 A1* 10/2009 Brown ........................... 707/705

(Continued)

*Primary Examiner* — Le H Luu
(74) *Attorney, Agent, or Firm* — Carmen Patti Law Group, LLC

(57) ABSTRACT

An exemplary method is implemented by end-user communication devices for transmitting and receiving emails in which acknowledgement of receipt by an addressee of an email is requested by an originator of the email. The email includes a digital packet having a header segment and a user data segment, the user data segment containing a user message and a command portion. An acknowledgement request command is stored in the command portion of an email. Upon receipt of the email by the addressee device and authorization to send an acknowledgement by the user, a reply email with an acknowledgement request is transmitted to the originator. Viewing of the content of the received email by the addressee is prohibited until the authorization is given. Accounting for acknowledgement receipts from multiple addressees is managed by the originator's device. A technique using a self-addressed email prevents an email recipient, who uses one device to initially read an email with an acknowledgement request from one email account, from having to again authorize an acknowledgement request when the same email is later read from the same email account using a different device.

18 Claims, 21 Drawing Sheets

(56) References Cited

U.S. PATENT DOCUMENTS

| | | |
|---|---|---|
| 2010/0304766 A1* | 12/2010 | Goyal .......................... 455/466 |
| 2010/0325470 A1* | 12/2010 | Underwood et al. ............ 714/2 |
| 2011/0033050 A1* | 2/2011 | Maller ......................... 380/259 |
| 2011/0145564 A1* | 6/2011 | Moshir et al. ................. 713/154 |
| 2012/0084707 A1* | 4/2012 | Abdel-Kader et al. ....... 715/779 |
| 2012/0190325 A1* | 7/2012 | Abu-Hakima et al. .... 455/404.2 |
| 2012/0254950 A1* | 10/2012 | Majeti et al. ..................... 726/4 |

* cited by examiner

|      | 0 | 1 | 2 | 3 | 4 | 5 | 6 | 7  | 8 | 9   | 10  | 11 | 12 | 13 | 14 | 15 | 16 | 17 | 18 | 19 |
|------|---|---|---|---|---|---|---|----|---|-----|-----|----|----|----|----|----|----|----|----|----|
| Ex1  | / | / | P | : | 1 | 0 | 0 | D  | E | A   | C   | T  | I  | V  | A  | T  | E  |    |    |    |
| Ex2  | / | / | P | : | 1 | 0 | 0 | W  | I | P   | E   | O  | U  | T  |    |    |    |    |    |    |
| Ex3  | / | / | P | : | 0 | 4 | 0 | H  | E | L   | L   | O  |    | F  | M  |    | M  | I  | K  | E  |
| Ex4  | / | / | P | : | 0 | 4 | 4 | E  | 0 | 0   | 6   | H  | E  | L  | L  | O  |    | F  | M  | .... |
| Ex5  | / | / | P | : | 0 | 3 | 7 | L  | 0 | 0   | 0   | 1  | 2  | 1  | M  | E  | S  | 1  | .... |    |
| Ex6  | / | / | P | : | 0 | 3 | 7 | L  | 0 | 0   | 0   | 1  | 2  | 2  | M  | E  | S  | 2  | .... |    |
| Ex7  | / | / | P | : | 0 | 1 | 12| E  | 0 | 0   | 5   | 255| L  | 0  | 0  | 0  | 2  | 2  | 1  |    |
| Ex8  | / | / | P | : | 0 | 1 | 7 | L  | 0 | 0   | 0   | 2  | 2  | 2  | M  | E  | S  | 2  | .... |    |
| Ex9  | / | / | P | : | 0 | 2 | 3 | U  | 1 | 1   | M   | E  | E  | T  |    | A  | T  |    | 9  |    |
| Ex10 | / | / | P | : | 0 | 2 | 3 | U  | 1 | 2   | M   | E  | E  | T  |    | A  | T  |    | 9  |    |
| Ex11 | / | / | P | : | 1 | 0 | 3 | O  | 127| 1  |     |    |    |    |    |    |    |    |    |    |
| Ex12 | / | / | P | : | 1 | 0 | 3 | O  | 127| 2  |     |    |    |    |    |    |    |    |    |    |
| Ex13 | / | / | W | : | 0 | 2 | 3 | U  | 1 | 191 | C   | A  | L  | L  |    | M  | E  | !  |    |    |
| Ex14 | / | / | W | : | 0 | 2 | 3 | U  | 1 | 192 | C   | A  | L  | L  |    | M  | E  | !  |    |    |
| Ex15 | / | / | W | : | 1 | 0 | 3 | O  | 127| 191|     |    |    |    |    |    |    |    |    |    |
| Ex16 | / | / | W | : | 1 | 0 | 3 | O  | 127| 191|     |    |    |    |    |    |    |    |    |    |

FIG. 5

| Value of byte 5 | Background Color | Specified Message Priority |
|---|---|---|
| 1 | Red | Emergency message, requires immediate attention |
| 2 | Yellow | Urgent message, requires attention soon |
| 3 | Green | Normal communication, response is expected |
| 4 | Gray | Normal communication, response is not expected |
|  | White | Public and unsecured communication |
| 5 | Red | Emergency message, requires immediate attention |
| 6 | Yellow | Urgent message, requires attention soon |
| 7 | Green | Normal communication, response is expected |
| 8 | Gray | Normal communication, response is not expected |
| 9 | Black | High Security Special Encryption/Decryption |

Sent Messages
[John Doe, Device 1]

2120  2030

| U* | Jane Smith, Jim Jones | 28 July 2011 |
|    | Delivery Confirmation | 11:10 AM |
|    | Ann Other | 27 July 2011 |
|    | xxxxx | 10:00PM |
|    | . | . |

Received Messages (Log View)
[Jane Smith, Device 1]

| U* | Jane Smith, Jim Jones | 28 July 2011 |

2110

Jane Smith acknowledged 28 July 2011 11:12AM

Jim Jones  unacknowledged

DELIVERY CONTROL FOR EMAIL COMMUNICATED AMONG MULTIPLE END USER COMMUNICATION DEVICES

CROSS REFERENCE TO RELATED APPLICATIONS

This application is a continuation-in-part of U.S. application, Ser. No. 13/199,307 filed Aug. 25, 2011, entitled DELIVERY CONTROL FOR MESSAGES COMMUNICATED AMONG END USER COMMUNICATION DEVICES, which is a continuation-in-part of U.S. application, Ser. No. 13/134,591 filed Jun. 10, 2011, entitled PRIORITY OF OUTBOUND MESSAGES COMMUNICATED AMONG END USER COMMUNICATION DEVICES, which is a continuation-in-part of U.S. application, Ser. No. 13/068,340 filed May 9, 2011, entitled MANAGEMENT FOR INFORMATION COMMUNICATED AMONG END USER COMMUNICATION DEVICES, which is a continuation-in-part of U.S. application, Ser. No. 13/065,839 filed Mar. 31, 2011, entitled "UBIQUITOUS USER CONTROL FOR INFORMATION COMMUNICATED AMONG END USER COMMUNICATION DEVICES".

BACKGROUND

This invention relates to communications among end user communication devices and more specifically to control of access to delivered email and confirmation to the email originator of the receipt of the email by the recipient as processed by end user communication devices, especially but not limited to, email, SMTP and HTTP communications by wireless end user communication devices, which may be made by different manufacturers and/or have different operating systems.

Wireless communication devices are now prevalent throughout all developed countries of the world. Although cellular telephones are currently the most widespread, other types of wireless communication devices include personal digital assistants, laptop computers with Wi-Fi and/or telecommunication carrier communication support, and various types of "pads" that provide visual displays that are larger than conventional cellular telephones but typically smaller than the displays of a laptop computer. Wireless voice communications between mobile devices utilizing different types of communication protocols, e.g. analog, TDMA, CDMA, VOIP, etc., are supported by different telecommunication carriers which provide appropriate communication protocol interfaces/gateways to facilitate voice communications between mobile units using different communication protocols.

Various types of transport layer communication protocols are supported by wireless communication devices. For example, text messaging, short messaging service (SMS), multimedia messaging service (MMS), email such as by simple mail transfer protocol (SMTP), and instant messaging utilizing hypertext transfer protocol (HTTP) are available. Each type service is supported by a transport layer communication protocol that is part of the telecommunication signaling structure associated with the transport of user communications and the communication of telecommunication infrastructure commands and signals.

The use of email by users of wireless and non-wireless communication devices is popular. Email typically uses SMTP as a transport mechanism. Some, but not all, SMTP servers and email clients support the transmission of a receipt confirmation from an addressee of the email to the email originator, if the originator had requested such notice. However, it is not mandatory that the email addressee actually send (permit) the transmission of the requested receipt confirmation, even if the addressee receives and reads the email. From the email originator's perspective, it should not be assumed that the addressee did not receive and/or read the corresponding email based on the failure of the originator to receive a confirmation of receipt.

SUMMARY

It is an object of this embodiment of the present invention to provide control of the addressee's ability to view the contents of a delivered email based on authorization of a mandatory acknowledgement confirmation to the email originator of receipt of the email, especially, but not exclusively, suited for SMTP and HTTP communications. In accord with an embodiment of the present invention, an exemplary method is implemented by end-user communication devices for transmitting and receiving emails in which acknowledgement of receipt by an addressee of an email is requested by an originator of the email. The email includes a digital packet having a header segment and a user data segment, the user data segment containing a user message and a command portion. An acknowledgement request command is stored in the command portion of an email. Upon receipt of the email by the addressee device and authorization to send an acknowledgement, a reply email with an acknowledgement request is transmitted to the originator. Viewing of the content of the received email by the addressee is prohibited until the authorization is given.

Accounting for acknowledgement receipts from multiple addressees is managed by the originator's device. A technique using a self-addressed email prevents an email recipient, who uses one device to initially read an email with an acknowledgement request from one email account, from having to again authorize an acknowledgement request when the same email is later read from the same email account using a different device.

Other embodiments of the present invention include the end-user communication devices that execute these methods.

An embodiment of the present invention also includes a computer program product, comprising a computer usable tangible medium having a computer readable program code embodied therein, where the computer readable program code is adapted to be executed to implement these methods.

Embodiments of the present invention further include all the steps, elements and features recited in the claims.

DESCRIPTION OF THE DRAWINGS

Features of exemplary implementations of the invention will become apparent from the description, the claims, and the accompanying drawings in which:

FIG. 5 is a table where each row represents a transmission of information in accordance with an embodiment of the present invention.

FIG. 11 is a table where each row represents a different message priority in accordance with an embodiment of the present invention.

FIG. 23 is an exemplary view of an email Sent Messages screen as seen by the originator of the shown sent messages following receipt of acknowledgement confirmation of the first shown message.

FIG. 24 is an exemplary view of an email Sent Messages screen as seen by the originator of the shown sent messages where the user requests the display of a log view of more details concerning acknowledgement receipt replies.

DETAILED DESCRIPTION

Figure 1:
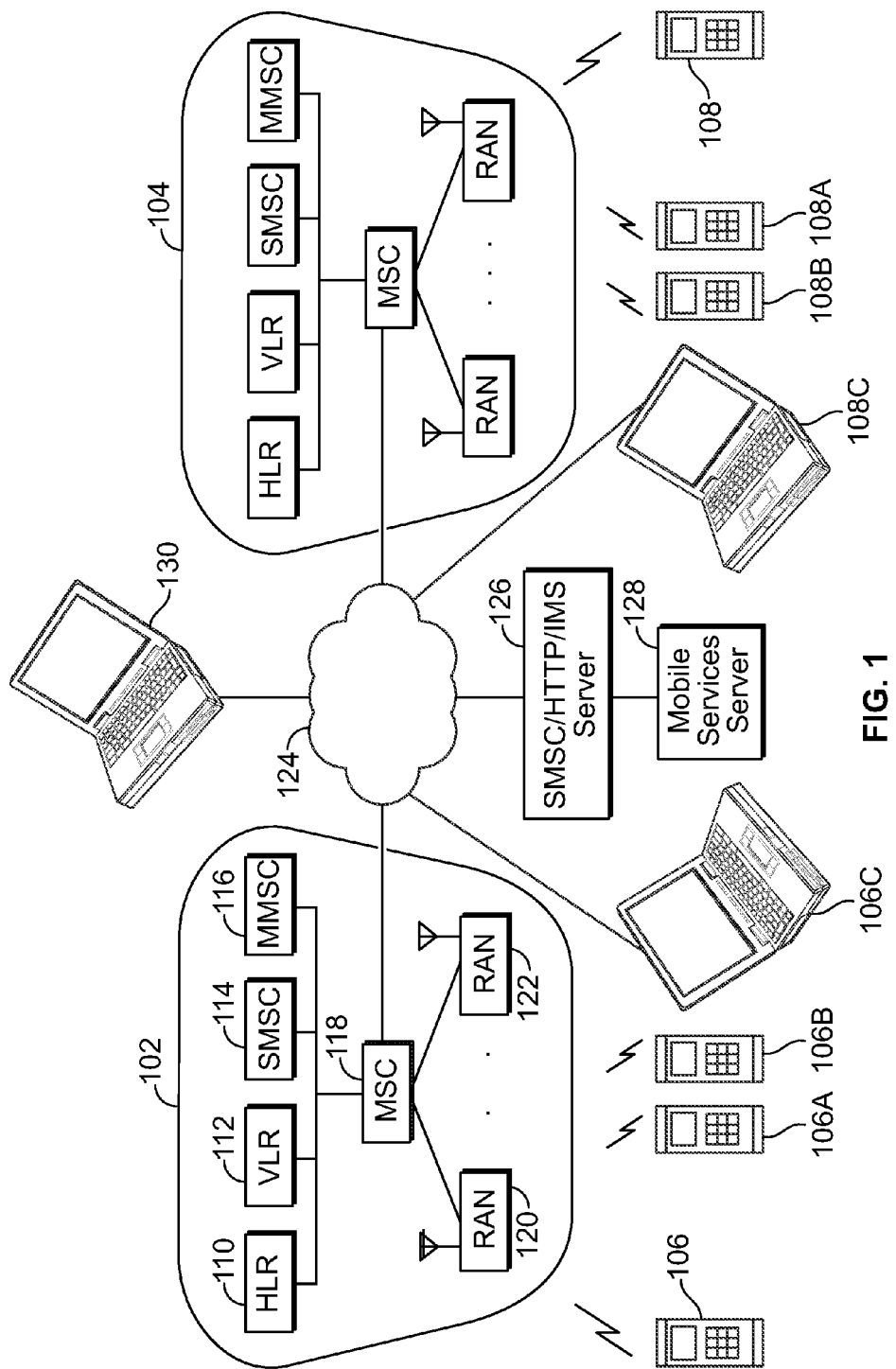
FIG. 1 is a block diagram of an illustrative communication system suited for supporting an embodiment of the present invention.

Referring to FIG. 1, wireless communication systems 102 and 104 support communications with a plurality of wireless mobile devices including exemplary wireless mobile devices (units) 106 and 108, respectively. In this illustrative example, a first user employs wireless mobile devices 106A and 106B and device 106C for communications, and a second user employs wireless mobile devices 108A and 108B and device 108C for communications. Devices 106A-C and 108A-C are capable of supporting email messaging via SMTP and/or HTTP communications. Communication devices 106C and 108C may be any type of non-wireless user communication device, e.g. laptop computer, desktop computer, etc. The communication system 102 includes a home location register (HLR) 110 that serves as an operations and administration center for registered wireless mobile devices and includes information of the current location of the respective mobile devices. A visitor location register (VLR) 112 provides temporary registration and location services for wireless mobile devices located in a communication system that is not the home system for the mobile device. A short messaging service center (SMSC) 114 functions as a server for the transmission and reception of SMS messages for wireless mobile devices supported by communication system 102. A multimedia service center (MMSC) 116 provides a similar function to SMSC 114 for the transmission and reception of multimedia information for wireless mobile devices supported by communication system 102. These nodes/elements perform their known functions as part of the infrastructure that supports wireless mobile communications. A mobile switching center (MSC) 118 provides switching for voice and data communications associated with the supported wireless mobile devices. A plurality of radio access nodes (RANs) 120 and 122 provide a wireless communications link between the system 102 and the supported wireless mobile units. Each RAN is connected to the MSC 118 wherein wireless messages received from a mobile unit by a RAN are transferred to MSC 118 for further routing, and messages to be delivered to a mobile unit are transferred from the MSC 118 to a RAN where such messages are then wirelessly transmitted by the RAN to the destination mobile unit. The elements of communication system 104 are the same as elements in communication system 102 and provide the same functionality for the respective supported mobile units. Hence, the elements of communication system 104 need not be described in detail.

A communication network 124 provides a communication link between the MSCs of systems 102 and 104. Communications with an exemplary SMSC/HTTP/IMS server 126 is also supported by network 124, where HTTP means hypertext transfer protocol and IMS means Internet map server. A mobile services server 128 is supported by server 126 and facilitates enhanced capabilities for wireless mobile units in accordance with an embodiment of the present invention. For example, wireless mobile units may access and download an application program from server 128 that can be installed and operate on the wireless mobile unit to provide enhanced functionality and control of user data in accordance with an embodiment of the present invention. This will be described in greater detail below. Another end user communication device 130, which may comprise a computer or other device, and user devices 106C and 108C are connected to the communication network 124 by other than a wireless communication link, e.g. a wire internet link through an IP service provider.

Figure 2:
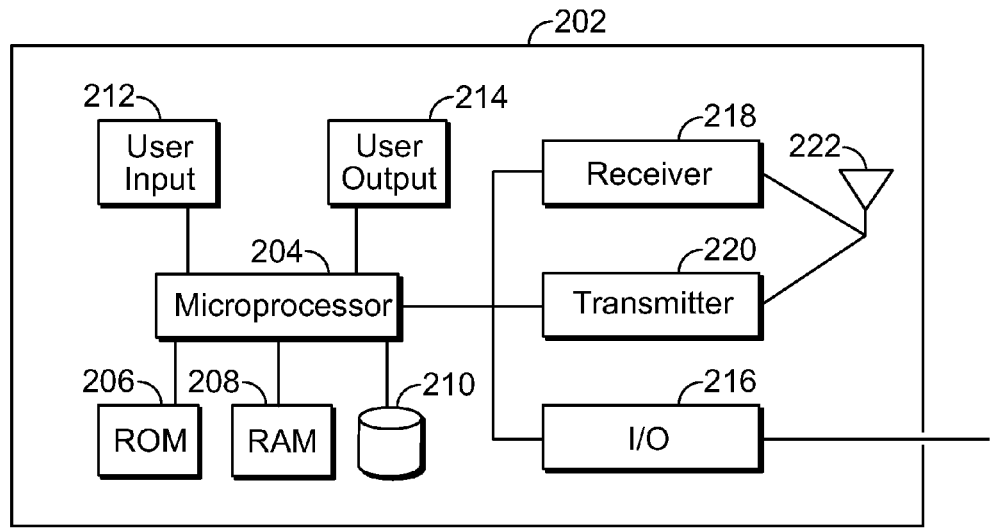
FIG. 2 is a block diagram of an exemplary device in accordance with the present invention.

FIG. 2 shows an exemplary block diagram of a device 202 which can represent mobile services server 128 or an end user wireless or wired device as explained below. A microprocessor 204 performs processes and tasks based on stored program instructions. It is supported by read-only memory (ROM) 206, random access memory (RAM) 208 and nonvolatile data storage device 210. As will be understood by those skilled in the art, data and stored program instructions in ROM 206 is typically utilized by microprocessor 204 to initialize and boot the computing apparatus. An application program, e.g. a program that controls the implementation of one or more functions performed by the device, is stored in storage element 210. At least active portions of the application program will be typically stored in RAM 208 for ready access and processing by microprocessor 204. The application program is specific to the functions to be performed by the device, and performs the functions and steps as described herein. A variety of user inputs 212 such as a keyboard, keypad, touchpad and/or mouse can be utilized to control the operation of the device and the application running on it. User outputs 214, e.g. a display monitor or screen, provide output for the user of the device. An input/output (I/O) module 216 provides a communication interface permitting microprocessor 204 to transmit and receive data with external nodes. The above described elements of device 202 are utilized in a wireless mobile unit, e.g. a cellular telephone, as well as in a server, e.g. mobile services server 128, and a wired connected end user device, e.g. a personal computer.

Where device 202 represents a wireless mobile unit, a radio frequency receiver 218, transmitter 220 and an antenna 222 are also present and used for wireless communications between the unit and supporting RANs. The I/O module 216 supports communications with supporting external peripherals, e.g. USB communications with a peripheral. When device 202 represents a wireless mobile unit, the application program controlling the microprocessor 204 is supported by an operating system and includes an enhanced services (ES) application program such as downloaded from server 128 and installed in the wireless unit. In this case, the user will be the person using the wireless mobile unit. The ES application program provides the wireless mobile unit with functions as explained below.

For non-wireless user devices, e.g. devices 106C and 108C, the application program controlling the microprocessor 204 is supported by an operating system and includes an enhanced services (ES) application program such as downloaded from server 128 and installed in the device. The ES application program provides the non-wireless device with the same enhanced services functions as explained below for wireless user devices. The enhanced services functions may be provided by a separate enhanced services application program or may be integrated within another program, e.g. a client email application program, a browser, etc. As used herein reference to enhanced services application program and/or enhanced services includes all such implementations. Of course, the non-wireless user devices would not utilize elements 218, 220 and 222 which support wireless connectivity.

Where device 202 represents the mobile services server 128 (where elements 218, 220 and 222 are absent), the I/O module 216 supports communications with supporting external nodes, e.g. server 126 or other nodes. In this case, the application program controlling the microprocessor 204 is supported by an operating system and includes a services support (SS) application program which supports the downloading, upon a request from a wireless unit, the ES application program from server 128 to the requesting wireless mobile unit. In this case, the user will be an administrator who maintains the operation of the server. The SS application supports the registration of wireless mobile units, and may also support the storage of user data for use in backup and restore functions with the respective wireless mobile units.

Figure 3:
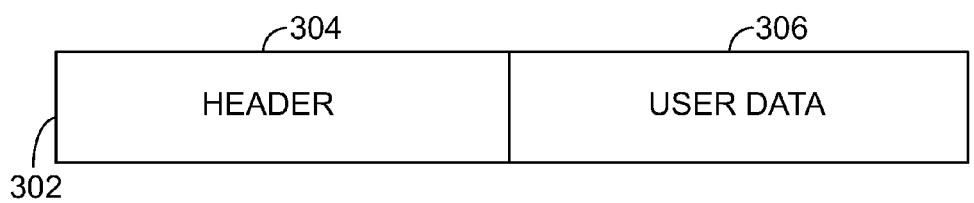
FIG. 3 illustrates a known packet structure for transmitting messages.

FIG. 3 illustrates a known packet 302 used for transmitting user messages. Packet 302 includes a header 304 and a user data portion 306. The header 302 contains a number of fields in which data represents information and parameters that are used in the transmission, routing and processing of the packet. The header fields differ depending on whether the packet was originated from a mobile unit or is to be delivered to a mobile unit.

Both types of packets include the following header information for SMS communications: the service center address (SCA), the protocol data unit type (PDU) that itself includes a variety of different fields, a protocol identifier (PID) that determines how the SMSC is to process the packet, the digital coding scheme (DCS) identifying the coding scheme within the user data, the user data length (UDL) that specifies the length of the user data. For packets to be delivered to a mobile, the header also contains: the originator address (OA), a service center time stamp (SCTS) identifying the time when the SMSC received the message. For packets originated from a mobile, the header also contains: a message reference (MR) that supplies a successive number that assists with reassembly of a user message that is sent using multiple packets due to its length, a destination address (DA), a validity period (VP) which identifies a time from where the message is no longer valid in the SMSC. The user data portion 306 contains a message of alphanumeric characters input by the user which is the information desired to be communication to another. As is known, the number of characters that can be contained within one user data portion 306 is limited in accordance with the data length limitation of 140 octets associated with signaling system seven (SS 7). Using 7 bit coding, 160 characters can be contained in one user data portion. However, if Unicode coding is utilized, user data portion will accommodate fewer characters as two bytes per character are used.

For email messaging, the header 304 will contain addresses of the originator and the addressee as well as other known parameters that used in routing, handling and processing of the message 302. For example, a field within the header 304 may contain a flag indicating that the email originator has made a known type of acknowledgement request (the type not requiring mandatory compliance by the addressee) of receipt of the email by the addressee. The information content from the originator to be delivered to the addressee resides in the user data 306.

Figure 4:
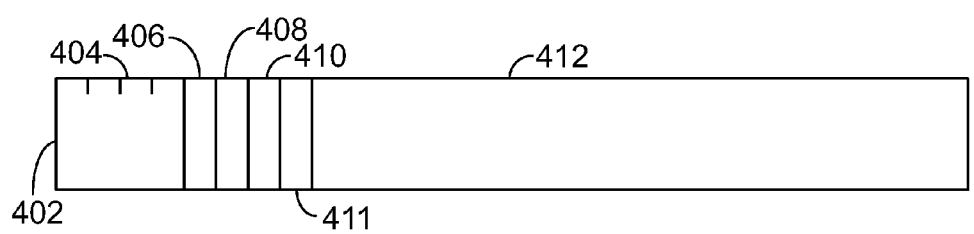
FIG. 4 illustrates a data segment having fields for containing information in accordance with an embodiment of the present invention.

FIG. 4 illustrates a data segment having a sequence of fields containing information in accordance with an embodiment of the present invention. The data segment 402 is coextensive with and resides within a user data segment 306. However, the data segment 402 contains command and control information in addition to a user input message. As will be explained in more detail below, a data segment 402 is processed by the enhanced services application program operating on the originating and terminating user communication devices wherein the command and control information is identified and processed based on predetermined command and control codes stored as part of the enhanced services application program. Because the data segment 402 is totally encapsulated within the user data portion 306, e.g. a user data portion of an SMS or email message, the data segments 402 are simply treated as conventional user data by the telecommunication infrastructure nodes which pass the encapsulated data segments 402 from an originating user device to a terminating user device. Only the end user communication devices process the data segments using the enhanced services application program and implement actions corresponding to any command and control information contained within the data segment 402, as well as providing the user with any user message included in a user data segment.

In the exemplary embodiment, field 404 of the data segment 402 consists of four bytes which identify one of a plurality of message types in accordance with predetermined message types stored in the ES application program. In this example, field 404 contains the label "//P:" wherein the characters // and : form part of the label, and the "P" identifies a specific type of message, i.e. a Peanut message type. In this exemplary embodiment, a Peanut message type identifies the message as being a person-to-person communication, i.e. an SMS message. Different characters in place of the "P" in this field can be used to identify other message types where each message type is associated with different subject matter, e.g. email represented by a "W" for Walnut email ES program, banking, insurance, coupons, games, health care, etc. Field 406 consists of one byte identifying the format or coding structure. In this example, field 406 may have valid values of 0, 1 or 2 wherein 1 indicates a control message, 0 indicates a normal user message utilizing 7 bit coding, and 2 indicates a normal user message utilizing the Unicode format. Field 408 consists of one byte having a value where this value identifies the priority of the associated message assigned by the message originator that is intended to alert the recipient of the intended priority, e.g. urgency, of acting on and/or responding to the message. As will be explained, this value may also control additional aspects, e.g. encryption/decryption. Field 410 consists of one byte, i.e. a command byte, identifying the length of message parameter values and may have valid values of 0-128. The value of field 410 specifies the number of sequential bytes that are part of a control portion of the data segment, i.e. bytes before the user input data begins. Field 411 consists of a number of bytes equal to the value in field 410, e.g. 0-128, and contains name value pairs as will explained in the below examples. Field 412 contains the user input information desired to be conveyed to another party. If the length of the user input information exceeds the number of bytes available in field 412 of one data segment, the user input information can be parsed and transmitted as multiple fragments sent in a series of SMS or email packets containing corresponding data segments 402 with the parsed user information.

FIG. 5 is a table where each row represents an example of bytes in different data segments 402. The top row of FIG. 5 contains labels of the first 20 bytes showing the respective byte positions 0-19. A first example, Ex1, shows an exemplary control message that will be interpreted by the ES application program operating on the destination wireless mobile unit to deactivate the ES application program on the subject mobile unit. The command may be sent from the SS application program running on the server as the result of termination of registration on the subject user or as a request of the owner of the subject mobile unit since the subject handset is currently lost or stolen. Deactivation of the ES application program will prevent the ES application program from operating on the subject mobile handset, which in turn prevents usage of features and/or user data only accessible through the ES application program. Bytes 0-3, which correspond to "//P:" define the data segment 402 as being a Peanut application. A "W" in field 2 would indicate a Walnut ES application, used for email, is to be used to process the data segment 402. The fields following field 2 function the same for all of the types of enhanced services application programs, i.e. P—Peanut, W—Walnut, etc. The 1 value in byte 4 defines the data segment as being a control message, the 0 value in byte 6 indicates that no length of message parameter values is specified, and the 0 in byte 5 is merely a place holder in the byte sequence since there is no user message and hence no corresponding message priority to specify. Where no user message exists, the value of byte 5 is not relevant, i.e. a "don't care value". The character string "DEACTIVATE" residing in bytes 7-16 will be interpreted by the ES application program on the recipient mobile unit as a predefined command to prohibit further operation of the ES application program on the subject mobile unit.

Example 2 of FIG. 5 is a data segment similar to example 1 in that it contains a "WIPEOUT" command that will be interpreted by the ES application program on the recipient wireless mobile unit as a request to completely wipe out user data stored through the Peanut application operating under the ES application program. That is, all messages, contacts, templates and other user data stored by the Peanut application will be deleted. These first and second examples are intended to be merely representative of a variety of commands that can be utilized, e.g. "ACTIVATE" to activate a Peanut application, "CHANGEPIN <xxxx>" to permit the changing of a personal invitation number or password to the value xxxx contained in the control message, etc.

Example 3 of FIG. 5 illustrates a different type of Peanut application data segment in which the 0 value in byte 4 indicates that the data segment is a normal message type. The 0 value in byte 6 indicates that no message parameter values are specified. The value 4 in byte 5 is used to convey the priority selected by the message originator in accord with FIG. 11. This message will be displayed on the screen of the recipient's communication device with a gray background, that is, the message of alphanumeric characters is displayed on a segment of the recipient's screen in which the background color of the segment is gray. The gray background color is intended to convey to the recipient that this is a normal communication and that a response is not expected by the originator. A predefined group of background colors with corresponding message priorities is made known to all end-users so that the originator of a message can specify a corresponding message priority that will be conveyed in accordance with the present invention to the recipient. The display of different background colors for the alphanumeric characters of the message is intended as exemplary of a variety of visual indicia that could be displayed on the screen of the destination device to denote message priorities. For example, the color of the alphanumeric characters themselves, the color of a portion of the screen segment displaying a message, the color of a separate field or distinctive symbol displayed adjacent the message text/field, type or style of the alphanumeric characters, shading associated with the alphanumeric characters and/or background, or other visually distinctive appearances with corresponding priority definitions can be utilized to convey different priorities for a message. It is preferred that the priority indicia always be included when the corresponding message is displayed, e.g. it will be displayed with saved messages, messages restored from backup storage, messages transferred to another user device, messages as displayed on the originating device, etc. Also, a larger number of types of priorities can be used to convey finer distinctions of originator expectations, e.g. orange color="urgent, confirm message receipt as soon as possible"; purple color="normal message priority, reply within X hours/days", etc. As among a group of users, the group members are free to agree that the available suggested priority categories (colors) will have an understood meaning that differs from the standard suggested meaning The Peanut application on the receiving wireless mobile unit will interpret this data segment as carrying a message, "HELLO FM MIKE", to be displayed to the user against a gray color background indicating a normal communication to which the originator does not expect a reply communication.

Example 4 of FIG. 5 carries the same message to be conveyed to the user as in example 3. Again, the 0 value in byte 4 indicates that the data segment is a normal message type. However, the 4 value in byte 6 indicates that 4 bytes starting at byte location 7 carry control information that precedes the user message. In this example, bytes 7-10 contain "E006", where the E in byte 7, i.e. a command identification character, indicates that an expiration of the subject message is to be executed (message is to be automatically deleted), 0 in byte 8 indicates expiration in zero days, 0 in byte 9 indicates expiration in zero hours, and the 6 in byte 10 indicates expiration in six minutes. That is, upon the receipt of this data segment by the Peanut application on the destination wireless mobile unit, the subject message, ""HELLO FM MIKE", will be conveyed to the user, but all instances of this message will be automatically deleted from recipient mobile unit on the expiration of six minutes. The value 4 in byte 5 indicates the message will be displayed with a gray background conveying a normal communication in which a reply communication by the recipient is not expected.

Example 5 shows an illustrative Peanut application data segment which is similar to example 4 in that the value in byte 6 is not zero indicating that a command in addition to the user messages contained in the data segment. In this example, the 7 in byte 6 indicates that seven bytes starting with byte 7 are associated with command information and precede the beginning of the user data to be conveyed. The L in byte 7 will be interpreted as signifying that the subject data segment is a long message, i.e. the subject user message has too many characters to be contained in only one data segment, thereby requiring fragmentation of the user message into a plurality of message fragments that will be transmitted in a number of data segments. The four bytes, bytes 8-11, collectively comprise a value used to identify each of the required data segments needed to complete the long message. In this example, this value is "0001". The next byte, byte 12, represents the total number of data segments required to complete the long message. In this example, byte 12 has a value of 2 indicating that two data segments are required to complete the single long message. Byte 13 represents the current fragment number of the subject data segment. In this example, byte 13 has a value of 1 indicating that this is the first data segment fragment of the long message in the long message fragments identified as "0001". The first character of the actual user message is in byte 14 with the remaining bytes in the subject data segment carrying further portions of a first message fragment. Example 6 shows the second and last message fragment that completes the long message identified by "0001". Byte 13 of example 6 contains a value of 2 indicating that it is the second in a message fragment series. It is also the last of the message fragment series since byte 12 indicates that the long message is contained in two message fragments. Byte 14 in example 6 contains the first character of user data in this data segment, but corresponds to the next character in the long user message that follows the last character of the user message contained in the preceding data segment represented by example 5. The value 3 in byte 5 in examples 5 and 6 causes the message characters to be displayed against a green screen background on the recipient's device which is intended to convey a normal communication in which a response is expected by the originator.

Example 7 illustrates a data segment that contains two commands. The value 12 in byte 6 indicates that 12 bytes starting with byte 7 are associated with commands. As explained in example 4, the values "E005" in bytes 7-10 indicate a message expiration upon five minutes from the receipt by the Peanut application. The value 255 in byte 11 serves as a predetermined separation character used to separate commands. Similar to example 6, the L in byte 12, which is the first field/character at the beginning of a command string, identifies this data segment as a long message. The bytes 13-16 serve to identify the fragments in series of data segments. Byte 17 has a value of 2 indicating that there are a total of two fragments in the long message series and byte 18 with a value of 1 indicates that this is the first fragment in the series. The first portion of the actual user message follows beginning at byte 19.

Example 8 represents the second fragment of the long message where the first fragment was described in example 7. It will be noted that this data segment contains only a single command associated with the long message fragmentation. That is, the time expiration contained as a first command in the first message fragment is not repeated. In accordance with an embodiment of the present invention, a time expiration command communicated in a first message fragment will automatically be effective for all succeeding fragments of the same long message. Thus, the entirety of the perceived long message will be subject to the time expiration. In this example, the value 7 in byte 5 indicates a command string of seven characters in which: L in byte 7 identifies this segment as a long message type, "0002" in bytes 8-11 identifies the long message fragment series, 2 in byte 12 indicates that the long message consists of two message segments, and the 2 in byte 13 indicates that this is the second fragment in the series of the identified long message, and since there are only two message fragments in this long message, the 2 in byte 13 also indicates that this is the last received fragment in the series. The remaining portion of the user message begins with byte 14 and continues to the conclusion of the user message is contained in this message fragment. The value 1 in byte 5 in examples 7 and 8 will cause the message characters to be displayed on the recipient's screen segment against a red background which is intended by the originator to convey an emergency message requiring immediate attention.

When a message sent from an originator's device using a native message client is received and processed by the destination device using the Peanut ES application, the message is displayed on the destination device's screen with a white background, denoting that this message was received as a public unsecured communication. Previously received messages are stored by the respective ES applications and always displayed with the corresponding background color of its associated priority as determined by byte 5 of the respective message. Preferably, messages being composed and stored by an ES application on an origination device are also displayed on the screen of the origination device by the ES application with the background color selected by the user for the priority of the respective message.

In the above examples of FIG. 5, all of the characters in the various byte positions are shown in a clear text format. In order to preserve security during the transmission of such messages, it is preferred that the majority of each message be sent in an encrypted format. For example, all bytes after byte 3 will preferably be transmitted utilizing a form of encryption. Those skilled in the art will understand that the use of such encryption requires that the receiving wireless mobile device be capable of decrypting the received encrypted characters thus transforming each received message into a corresponding clear text format as illustrated in accordance with FIG. 5.

Examples 9-12 illustrate formats associated with message confirmation. The operational aspects and control associated with message delivery confirmation (reply receipt request) feature are described below with regard to FIGS. 9 and 13-18. One aspect of originating a communication containing a delivery confirmation request is that the recipient's device is able to receive the message but the recipient is not able to open, i.e. view, the contents of the message until authorizing the transmission to the originator of a control message representing an acknowledgment of receipt by the recipient of the originator's associated message.

Example 9 of FIG. 5 illustrates a Peanut application data segment of an SMS message illustrating a message to be sent from an originator's device wherein, in accordance with an embodiment of the present invention, confirmation of receipt of the associated message by the recipient is requested. The 0 value in byte 4 indicates that the data segment is a normal message type, i.e. not only a control message. The value 2 in byte 5 indicates a corresponding message priority. The value 3 in byte 6 indicates that the next 3 bytes represent command information, with the user message beginning with the following byte. The character "U" in byte 7 indicates that this is an "unopened" message. The value 1 of byte 8 indicates a request for acknowledgment of receipt of the message, e.g. requiring the recipient to manually authorize a receipt message to be sent to the originator that is a condition precedent to the recipient being able to open/view the associated originator's message. The value 1 in byte 9 provides a numerical reference, preferably uniquely assigned to each message for which a return receipt is requested, that aids in identification by the originator's device of the particular message to which a subsequently received acknowledgement message is associated. Although common integer values are shown in byte 9 for examples 9-12 to assist in understanding, it may be preferable to generate a value that is unique to each message that achieves a higher degree of uniqueness at the expense of requiring a more complex process to generate the value. For example, a hash algorithm based on sender information (e.g. originator's address), recipient information (e.g. recipient's address), date and time of the sending of the associated message may be utilized to generate a unique value utilized in byte 9 to identify each transmitted message. Utilizing such a process is advantageous in providing a higher degree of certainty in identifying the originating message upon receipt of an acknowledgment reply command, especially where the original message contains many recipients such as may be the case for certain types of communications, e.g. e-mail, etc. As will be explained in more detail with regard to examples 11 and 12, the same numerical reference received as part of an incoming message is utilized in a corresponding acknowledgment reply sent by the recipient to acknowledge receipt of the subject message. The user message "MEET AT 9" begins in byte 10 and concludes with byte 18.

Example 10 represents another SMS message generated by the same originator's device as the message shown for example 9. The message of example 10 represents the transmission of the same message as shown in example 9 to a different recipient. Example 10 differs from example 9 in that the value of byte 9 in example 10 is 2 as opposed to 1 in example 9. As will be explained in more detail with regard to examples 11 and 12, the value of byte 9 aids the originator's device in associating the receipt of an acknowledgment communication with the corresponding message previously sent from the originator's device. Examples 9 and 10 illustrate that only delivery confirmation request commands are present. However, as explained above with regard to example 7, other commands in addition to a delivery confirmation request can be included with a given text message.

Example 11 represents the format of an SMS message representing an acknowledgment message sent from the recipient's device to the originator's device of a received SMS message by the recipient for which delivery confirmation had been requested by the originator. The 1 value in byte 4 identifies this SMS Peanut message as being a control message that does not include any text-based characters inserted by the originator to be displayed as a corresponding message on the screen of the recipient. The value 3 in byte 6 indicates that the next 3 bytes represent command information. The letter "O" in byte 7 represents an opened message. The value 127 in byte 8 represents a predetermined value that defines the control message as indicating an acknowledgment response message. The value 1 in byte 9 represents the same value that was contained in byte 9 of the associated originator's message to which the subject acknowledgment message is in response. In the illustrative example, the acknowledgment reply message as shown in example 11 is a response from the recipient of the originator's message as shown in example 9. Thus, the value 1 in byte 9 of example 11 is selected to match the same value 1 as in byte 9 of example 9. If the value in byte 9 of example 9 had been, for example, 21, a corresponding value 21 in byte 9 of example 11 would have been used.

Example 12 is similar to example 11 in that it represents a control message of an acknowledgment message. In this illustrative example, it represents an acknowledgment message sent from the recipient of the message as shown in example 10. Thus, the value 2 in byte 9 matches the value 2 in byte 9 of the origination message as shown in example 10.

Figure 6:
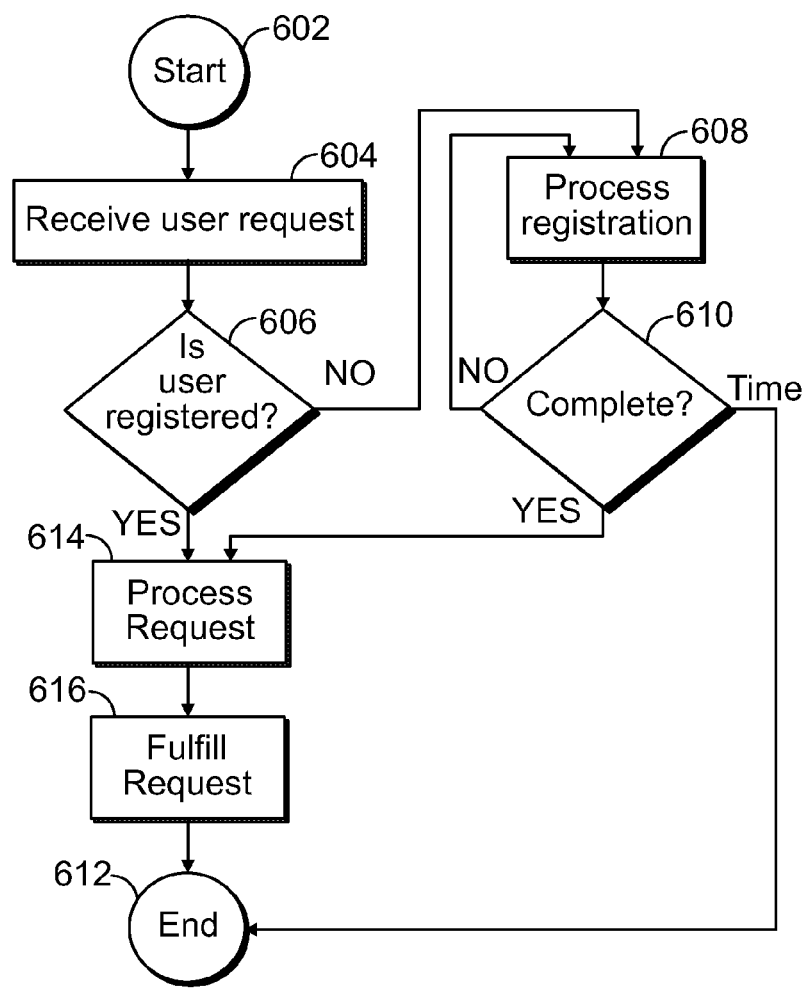
FIG. 6 is a flow diagram illustrating the operation of the mobile services server in accordance with an embodiment of the present invention.

FIG. 6 is an illustrative flow diagram of the operation of the mobile services server in accordance with an embodiment of the present invention. The illustrated process begins with START 602. In step 604 the server receives a user request in the form of a message such as including a command in the format as illustrated in FIG. 5. Upon receiving the user request, a determination is made in step 606 of whether the user is registered. This step may include the services server querying a database storing a list of registered users to determine if the requesting user is registered. A NO determination by step 606, indicating that the requesting user is not registered, results in step 608 beginning a registration process of the subject user. The process may include the transmission of messages between the server and the user's wireless mobile unit or non-wireless device by which the server ascertains sufficient information to register the user. In step 610 a determination is made of whether the registration process is complete. A NO determination by step 610 results in further processing by step 608. Should the registration process not be completed within a predetermined time period, step 610 will time out resulting in the termination of the process and the request has indicated at END 612.

A YES determination by step 606 or a YES determination by step 610 results in the user request being processed as indicated by step 614. Processing of the request may include parsing the received request to determine included commands and/or user message components. Such processing is substantially the same as described later with regard to processing of received messages by end user device. In step 616, the request is fulfilled. The fulfilling or action taken in response to the request will vary depending upon the nature of the request itself The action taken may be applicable to the end user unit that originated the request or to a different unit. For example, a BACKUP request will cause the uploading and storage of user data contained on the requesting unit to the services server. A RESTORE request will cause the stored user data previously obtained during a BACKUP request to be downloaded and installed on the requesting local unit from the services server. However, other commands may initiate actions to be taken at a unit that is not the requesting unit. For example, a DEACTIVATE request received by the services server from a first unit will cause another unit, having an address specified in the request, to be deactivated. Such a request requires user authentication to ensure that the user making the request is the registered owner of the device to which the deactivation request is directed. The process terminates at END 612.

Figure 7:
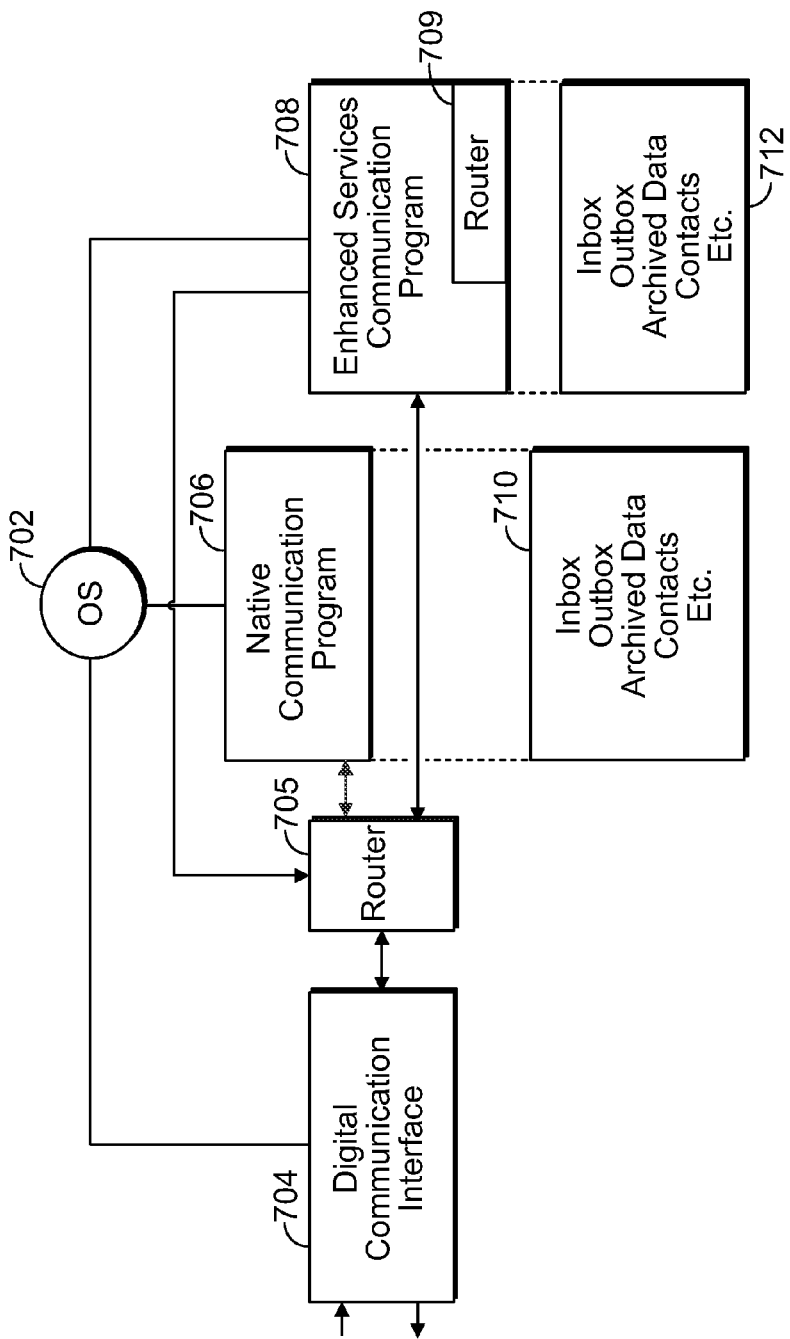
FIG. 7 is a representation of the relationship of application programs operating on a communication device that provides enhanced services in accordance with an embodiment of the present invention.

FIG. 7 shows the relationship of programs operating on a wireless mobile unit or non-wireless end user device that provides enhanced services in accordance with an embodiment of the present invention. This shows an overview of the general relationship between the operating system (OS) 702, the digital communication interface 704, router 705, a native communication program 706 and the enhanced services communication program 708. As known to those skilled in the art, a number of different operating systems support the operation of various programs and applications on different wireless mobile units, e.g. Symbian, Android, Apple's iOS, Research In Motion's BlackBerry OS, Microsoft's Windows Phone, etc. On a non-wireless device a Microsoft Windows operating system or other known systems may be used. The digital communication interface 704 recognizes the transport layer communication protocol, e.g. SMS, MMS, email, etc., used to convey the received information and converts the information provided from the wireless receiver into a digital character string for processing by the native communication program 706 or the enhanced services communication program 708. The digital communication interface 704 also converts a digital character string received from program 706 or 708 into information in the specified transport layer communication protocol provided to the wireless transmitter. Router 705 controls whether the digital communication interface communicates with the native communication program 706, the ES communications program 708, or both based on instructions received from the ES communication program. For example, the user can select via the ES communication program to have all incoming messages sent for processing by both the native communication program 706 and the ES communications program 708. Alternatively, the user can select via the ES communication program to have all incoming messages sent for processing only to the ES communications program 708, which is capable of processing messages received with native formatting or ES application formatting. Choosing the latter is advantageous since the ES application is capable of additional services, e.g. received messages of all formats can be conveniently backed up and later retrieved/ restored into the same user device or another device of the user via these features of the ES application.

Native communication program 706 supports a plurality of files and/or records 710, e.g. inbox, outbox, archived data, contacts, etc. The native communication program refers to the communication program originally supplied by the manufacturer or service provider upon the initial acquisition of a wireless mobile unit by a user. The enhanced services communication program 708 is an application program that is typically installed by the user such as by downloading it from the services server or otherwise installing it from an external source. The enhanced services communication program 708 also supports a plurality of files and/or records 712, e.g. inbox, outbox, archived data, contacts, etc. In accordance with an embodiment of the present invention, the user must obtain access to the enhanced services communication program in order to access its supported files and records. Access may be, for example, obtained by entering a user identification and corresponding password in response to user prompts displayed on the screen by the enhanced services communication program upon request to open this program. Interactions between the enhanced services communication program and the native communication program is supported by an application program interface (API) associated with the native communication program and/or supported by the operating system itself.

In the illustrated example, the digital communication interface 704 transmits and receives digital communication strings with both the native communication program 706 and the enhanced services communication program 708. Since communications originated from a wireless mobile unit utilizing the enhanced services communication program is encrypted, the receipt of such an encrypted communication by a destination mobile device will be unintelligible as viewed from a native communication program of the destination mobile device. However, the message may be viewed in clear text format by utilizing the enhanced services communication program on the destination mobile device. For example, a received SMS text message that was transmitted from an enhanced services communication program on the origination mobile device, will appear as a string of unintelligible characters when viewed by the native communication program of a recipient device, except for the leading format indicator "//P:". The same message will be displayed in a clear text format in the inbox of enhanced services communication program (Peanut) on the recipient device. Similarly, an email message handled by the Walnut enhanced services communication program would be shown in clear text but would be shown as unintelligible characters when viewed by a native or other communication program or by a device with Walnut installed that is not an addressee of the subject email message.

The enhanced services communication program 708 may include a plurality of modules or sub-programs that support different types of enhanced services, e.g. Peanut "//P:" for messaging, Walnut "//W:" for email, Hazelnut "//H:" for banking, Brazilnut "//B:" for insurance, Chestnut "//C:" for games, Pistachio "//PH:" for healthcare, The Nest "//TN:" for coupons, etc. In support of multiple types of ES, the enhanced services communication program 708 also contains a router module 709 which determines the type of received communication based on the identifying format, i.e. the "//X:" designation, and routes the communication to the corresponding module for processing. This routing is independent of the transport layer communication protocol that was used to convey the incoming communication to the destination communication device.

For example, an incoming SMS message from the user's automobile insurance agent may contain a notice of the date on which the term of the current insurance policy will be expiring and a reminder to pay the premium to keep the policy in effect. This SMS message will have been transmitted from a device using ES originated by the Brazilnut module "//B:" format since the subject matter of the communication deals with insurance. The router module 709 in the recipient's communication device will recognize this ES format and route the corresponding communication to the Brazilnut module for processing. An ES email communication concerning insurance, sent from an originator device using the Brazilnut module, could have been used to convey the same message wherein the router module 709 in the recipient's communication device would route the email communication with a "//B:" format to the Brazilnut module for processing.

Each ES module supports a unique ES format to identify itself and contains its own segregated set of user utilities, i.e. inbox, outbox, etc. That is, each ES module may require a separate user identification and password in order to access the corresponding user utilities, and will have different encryption/decryption requirements than other ES modules. As explained above, encryption is used for ES communications except for the ES format identification. To properly decrypt a received communication into clear text, the incoming communication must be processed by the ES module in the destination user's device that corresponds to the ES module used to originate the communication since each ES module uses a different form of encryption. For example, an incoming Brazilnut communication received by the intended destination device and processed by its Brazilnut module will be decrypted into a clear text message. However, an incoming Brazilnut communication received by the intended destination device if processed by an ES module other than the Brazilnut module would not be properly decrypted into a clear text message since the decryption process would not match the encryption process. Thus, ES communications, even if processed by the intended destination device, will appear as a character string that is not intelligible if processed by the native communication program of the device or by an ES module of a different format. An ES communication if received or intercepted by an unintended destination device will appear as an unintelligible character string since the encryption/decryption process is also unique to the originator/recipient, i.e. the encryption/decryption key includes parameters associated with specific devices/users. Hence, the embodiment of the present invention provides identity management as well as subject matter organization and management.

Figure 8:
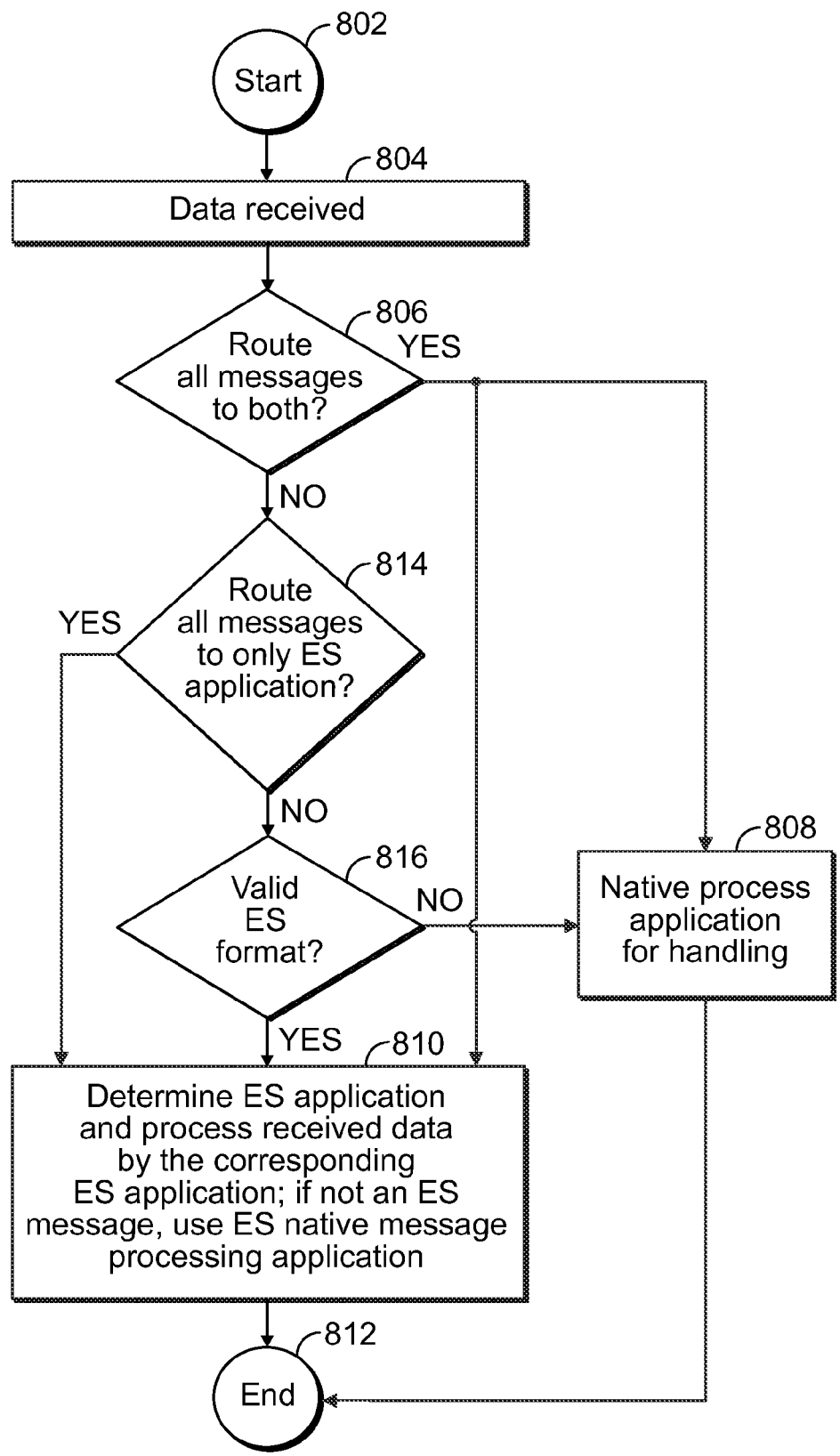
FIG. 8 is a flow diagram of a method practiced by a communication device that provides enhanced services in accordance with an embodiment of the present invention.

FIG. 8 shows steps of a method practiced by a communication device that provides enhanced services in accordance with an embodiment of the present invention. This process begins at START 802. In step 804 incoming data originated from another communication device is received at the subject destination communication device. The ES application provides a user selectable input by which the user chooses how received messages are to be processed. That is, the user can select whether to have all messages routed to both ES application and the native application or have all messages routed only to the ES application for processing. This user input selection is stored in memory as part of the ES application in the corresponding communication device and controls how received messages are routed in accordance with the control provided by the ES communication program 708 to the router 705.

A determination is made in step 406 of whether all received messages are to be routed to both the native processing application and the ES application. A YES determination by step 806 causes the received message to be transmitted for processing to both the native processing application 808 and to the ES application 810. A NO determination by step 806, indicating that the user has not selected that all incoming messages be processed by both applications, results in step 814 making a determination of whether the user has selected all incoming messages to be processed only by the ES application. A YES determination by step 814 results and all incoming messages being processed by the ES application at step 810. A NO determination by step 814 results in step 816 making a determination if a valid ES format is present in the received message. For example, a valid ES format can be determined to have been received in a message if the first 4 bytes consist of "//X:" where the X corresponds to one of the valid modules in the ES application. A NO determination by step 816 results in the message being transferred to the native process application for handling as indicated at step 808. A YES determination by step 816, indicating that a valid ES format is present in the received message, results in the message being processed by an ES application at step 810. In step 810, the ES module to be utilized to process the received message is determined based on the "X" as explained above. If a message is received by step 810 for processing that does not contain a valid ES module identification, the ES application will still process the message as a native message in a manner similar to the native process application. However, the native processing provided by the ES application differs from the processing provided by the native application in that the ES application places the resulting message in an inbox of a predetermined default ES module, e.g. the message is displayed to a user in the secure inbox of the Peanut application. An advantage of having the ES application process all of the received messages is that all of the supported ES features, e.g. security, backup, retrieval, restore, etc., is made available for all received messages, even messages that were originated from a user device with native processing. It also permits the user to easily transfer all of the saved messages stored on one handset to another handset, even where the other handset is made by a different manufacturer and/or utilizes a different operating system. Since all received messages are stored only in secure inboxes of the ES application, all received messages are protected by the security provided by the ES application.

Figure 9:
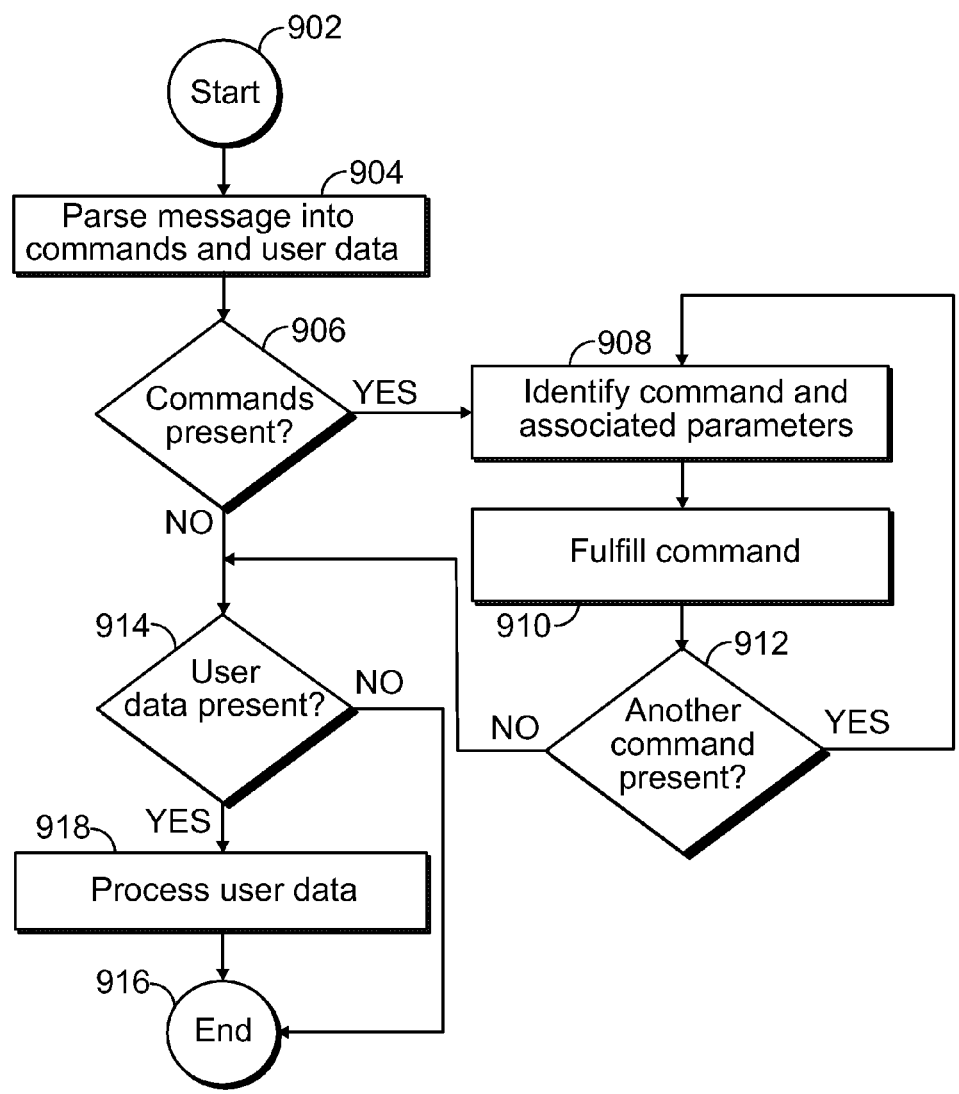
FIG. 9 is a flow diagram of steps utilized by a communication device to process a received message in accordance with an embodiment of the present invention.

FIG. 9 shows a flow diagram of steps utilized by a communication device to process a received enhanced services message in accordance with an embodiment of the present invention. Beginning with START 902, the received message is parsed into commands and user data in step 904. As explained with regard to FIG. 5, the values contained in bytes 4 and 5 can be used to separate the received message into commands and user data. The message may consist of only commands, only user data, or commands and user data. In step 906 a determination is made of whether commands are present. A YES determination by step 906 results in step 908 identifying a first command and its associated parameters. The type of command is identified by comparing the received command characters with a table of predetermined commands stored in the communication device as part of the enhanced services application program. This table also contains a stored list of predetermined parameters associated with the command, where the value of receipt parameters determines the extent or range of an associated action associated with the command. In step 910 the identified command is fulfilled, i.e. depending on the type of command, the command may be immediately executed or scheduled to be executed upon the occurrence of an event or scheduled for execution at a later time. In step 912 a determination is made of whether another command is present in the received message. A YES determination by step 912 results of processing continuing with step 908.

A NO determination by step 906 or a NO determination by step 912 results in step 914 making a determination of whether user data is present in the subject received message. A NO determination by step 914, indicating that no user data is present to be processed, results in the conclusion of processing at END 916. A YES determination by step 914 results in step 918 processing the user data contained in the received message. Typically, in the case of an SMS text message, processing user data includes providing an alert to the user indicating that a message has been received, displaying the received message on the screen of the user's wireless mobile unit along with visual indicia indicating the priority assigned by the originator, and storing the received message as a file or record, e.g. a record in the INBOX of the enhanced services application program. Assuming the message was transmitted as an encrypted format, the message will be decrypted, displayed on the screen with corresponding visual indicia, and stored in the INBOX as a clear text message by the enhanced services application program. However, the processing of the user data in accordance with step 918 is subject to commands that may be included in the associated message. Thus, prior to displaying the text message received from the originator on the recipient's screen, the associated commands with the subject message are processed to determine if other events and/or actions are required to be implemented before the display of the message. The processing that concludes at END 916.

For a received message, e.g. an SMS or email text message, with delivery confirmation requested by the originator, the received text message will not automatically be displayed on the screen of the user's communication device. Upon the recipient attempting to open a received text message having a confirmation request, a query will be presented, e.g. via a pop-up screen, asking whether the recipient authorizes confirmation of receipt to the originator. If the recipient authorizes the requested confirmation, a corresponding message carrying the confirmation signal will be transmitted from the recipient's device to the originator's device, and the recipient will be permitted to access/view the contents of the associated received text message. For example, the associated text message may be automatically displayed on the screen of the recipient's device following authorization of the transmission of the reply confirmation signal.

In accordance with a first embodiment, the associated text message will not be displayed to the recipient until the transmission of the reply confirmation message has been successfully completed. In a second embodiment, the associated text message will be displayed to the recipient following authorization approval even if the actual transmission of the reply confirmation message is yet to be completed. The second embodiment may be useful in allowing immediate access by the recipient to the contents of the associated text message where the recipient's device, at the time of attempted message access by the recipient and authorization approval, does not have current communications with the supporting network and hence is unable to complete the transmission of a reply confirmation message at that time.

If the recipient declines to authorize the confirmation requested by the originator upon the initial receipt of the message, the contents of the associated text message will not be displayed on the screen of the recipient and the recipient will not be able to access/view the contents of this message. However the received message (along with associated command and control information) is stored in memory in the recipient's device and upon each later attempt by the user to open/view the subject message, the user will be asked to authorize the requested confirmation. If upon a subsequent attempt to open the subject message the user/recipient agrees to authorize the requested confirmation, a corresponding confirmation message will then be transmitted to the originator and the recipient will be permitted to access/view the contents of the associated text message. Upon the acknowledgment confirmation message having been authorized and sent, the enhanced services application on the recipient's device modifies the corresponding received message as stored in memory by changing the "U" (meaning unread) in the command portion of the received message to "O" (meaning opened). On each user request to open a received message, the enhanced services application checks the command portion of the associated message as stored in memory for a potential command, e.g. a delivery confirmation command that has not been acknowledged (a "U" status), prior to displaying the user message. The display of the corresponding user message will be prevented if such a corresponding command is found. Thus, by changing the status of a received message in memory of a recipient's device from Unread to Opened, the enhanced services application will thereafter, upon a request by the recipient to open the subject message, display the subject user message without displaying a pop-up window requesting the authorization to send a confirmation to the originator.

When the originator's device of the subject text message receives an acknowledgement confirmation command message from a recipient's device, this message will contain the recipient's address in addition to information indicating that a corresponding message stored in the originator's Outbox has been received/opened, e.g. see bytes 7 and 8 in example 11 of FIG. 5. The received acknowledgement confirmation command message is correlated with a corresponding sent text message in the originator's Outbox via reference to the recipient's address and the numerical reference, e.g. see byte 9 in example 9 of the outgoing text message and byte 9 in example 11 of the corresponding acknowledgement confirmation command message.

Figure 10:
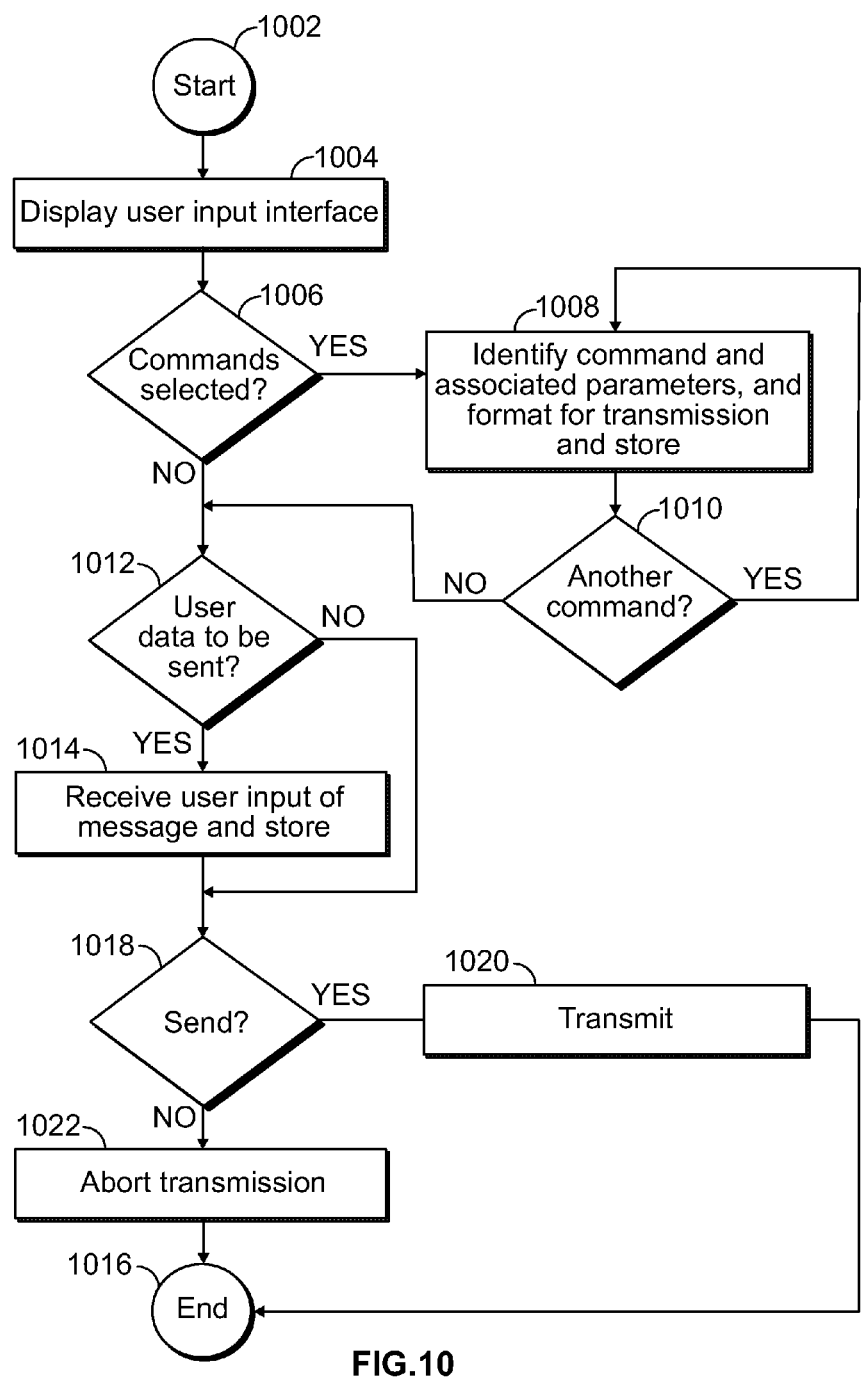
FIG. 10 is a flow diagram of steps utilized by communication device associated with the transmission of a message in accordance with an embodiment of the present invention.

FIG. 10 shows a flow diagram of steps utilized by wireless mobile unit or non-wireless device associated with the transmission of a message by an ES module of the enhanced services application program in accordance with an embodiment of the present invention. Beginning with START 1002, a user input interface is displayed on the screen of the user's unit for the ES module selected by the user at step 1004. This input interface may consist of graphical user interface with one or more menus each containing a list of items or commands for selection by the user. Alternatively the user may be presented with a blank field in which alphanumeric characters can be entered by the user. Part of the input interface may include the selection of an existing contact or entry of the address of the unit to receive the message being composed. In step 1006 determination is made of whether commands have been selected by the user to be included in the message to be transmitted to another user. A YES determination by step 1006 results in step 1008 identifying the command and its associated parameters to be included in the message, and storing the command in an appropriate format for later transmission. As part of the enhanced services application program, each of the user selectable commands as provided by user input interface is linked to a corresponding command by a table or records stored in the communication device as part of the enhanced services application program. As explained with regard to FIG. 5, a first command and its parameters are formatted to occupy a series of bytes beginning with byte 7. In step 1010 determination is made of whether another command is selected by the user to be included in the same message. A YES determination by step 1010 results in step 1008 processing further selected command. Example 7 in FIG. 5 illustrates a second command included in the same message. Formatting of further commands includes inserting a separation character "255" at the byte following a previous command followed by the insertion of the command characters and its parameters. After the insertion of all commands to be transmitted in a single message, the values in byte positions 4 and 6 are determined and inserted as previously explained with regard to FIG. 5.

A NO determination by step 1010 or by step 1006 results in step 1012 making a further determination of whether user data is to be sent as part of the message being composed by the user. A YES determination by step 1012, indicating that user data is to be included, results in step 1014 receiving the user input of the data to be included in the message and storing the user data beginning at the byte position following the last byte of the last command. User input data can be input utilizing a graphical user interface such as from menu selection or by accepting alphanumeric characters entered the user in a predetermined data entry field; see FIGS. 12, 15. For each message, the originating user can select a priority, such as one of the exemplary priorities shown in FIG. 11, that will be assigned to the message. Messages are transmitted with a default priority, e.g. "GRAY", if the originating user does not set a different priority before the message is completed. This is explained in more detail with regard to FIGS. 12-16. Following step 1014 or upon a NO determination by step 1012, indicating that no user data is to be included, a determination is made in step 1018 of whether the completed message should be sent. A YES determination by step 1018 results in the composed message being transmitted from the utilized ES module to the destination unit by step 1020. As part of the transmission process, the transmitted message may be stored in the OUTBOX of the corresponding ES module in the originating unit. The process concludes at END 1060. A NO determination by step 1018, indicating that the composed message is not to be transmitted, results in the aborting of the transmission of the message at step 1022 and determination of processing at END 1016.

FIG. 11 shows a table where each row represents a different message priority selectable by the originating user in accordance with an embodiment of the present invention. This information is stored in memory associated with the ES application. The left column shows a value that is placed in byte 5 of the ES format regardless of which ES client application, e.g. Peanut, Walnut, Brazil Nut, etc., is used to transmit the message and regardless of which message format, e.g. SMS, MMS, email, etc., is used. Each ES client application capable of transmitting messages of different message formats. The middle column shows an assigned color for the each priority that will be displayed as the background color against which the alphanumeric characters of the message will be shown to the message recipient. The right column describes the condition that each priority represents.

In addition to displaying a background color indicative of the message priority, the value of the priority byte may be utilized by the ES application for other purposes and functions. For example, the type of encryption/decryption utilized for a message may be determined based on the value of the priority byte, e.g. values 1-4 may be interpreted by the ES application to utilize a default type of message encryption/decryption with the corresponding background colors shown in FIG. 11, while values 5-8 causes the ES application to utilize a different type of message encryption/decryption with the display of the same background colors as for values 1-4, respectively.

Also the value of the priority byte can indicate a message security level, e.g. the value 9 may cause a black background color to be displayed with the message and cause the ES application to utilize a higher level or different encryption/decryption technique such as requiring a dynamic key exchange or a user entered encryption/decryption key in order to encrypt/extract the clear text message. For example, when the originating party selects BLACK as a priority indication, the originator is prompted to enter a password which is used as a custom encryption key to convert clear text message to cipher text that is transmitted to the destination party. On the receiving end, an incoming message with a BLACK priority is received and stored in the cipher text mode. To convert the cipher text message with an associated BLACK priority to clear text, the receiving party will be prompted to enter a password as part of a dynamic key exchange, where the password entered by the receiving party must be the same password used by the originator or a decryption password associated with the encryption password utilized by the originator as part of a linked encryption/decryption key. The described encryption/decryption technique and the storage of the message as cipher text for priority value 9 (BLACK) priority messages differ from the priority values 1-4 and 5-8 in that the encryption/decryption of messages associated with the other priorities is processed automatically in accordance with the ES application and the corresponding messages are displayed and stored in clear text format both at the originating and receiving devices. A received BLACK priority message is stored and displayed as cipher text, and will not be displayed as clear text unless the user enters the required password/key.

Message priorities as implemented by an embodiment of the present invention are ubiquitous. A message of a specified priority, e.g. green, is displayed with the same priority indicia to the recipient regardless of transport layer communication protocol used to transport the message, i.e. whether the message was conveyed via SMS, MMS, email, etc. Further, message priority is uniform across all modules of the ES application so a "red" priority SMS message originated by a Peanut module, a "red" priority SMS message originated by a Brazil Nut module and a "red" priority email message originated by a Walnut module are displayed with the same priority indicia to the recipient even though the received message is processed by different modules of the ES application. The originating device using the ES application saves sent messages with the corresponding priorities and displays sent messages with the same priority indicia as presented to the recipient. Hence, users can easily discern by the display of sent messages the priority that was associated with each.

Figure 12:
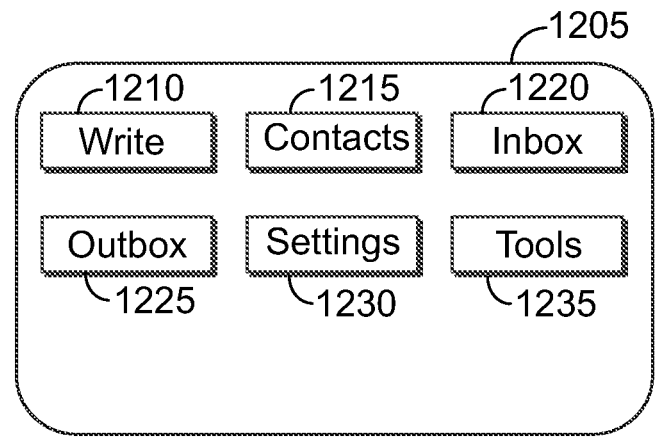
FIG. 12 is an exemplary view of a home screen of an enhanced services module as displayed on a wireless mobile unit providing a graphical user interface in accordance with an embodiment of the present invention.

FIG. 12 shows an exemplary view of a home screen of an enhanced services module, e.g. Peanut or Walnut module, providing a graphical user interface for a communication device. The exemplary screen 1205 represents a home or base screen that provides a graphical user interface for the corresponding module of the enhanced services application. The illustrative displayed icons include WRITE 1210, CONTACTS 1215, INBOX 1220, OUTBOX 1225, SETTINGS 1230, and TOOLS 1235. These icons are user selectable and provide a link to further graphical user interface screens that can be utilized to control features of the enhanced services application and input user data. Selecting the WRITE icon provides a gateway for the user to reach a Write Message screen that supports the composition and input of the message under the control of the originating user. The Write Message screen also allows the user to select various control settings that will apply to just the subject message, i.e. insert commands as explained with regard to FIG. 5. Selecting the SETTINGS icon provides a gateway for the user to reach a screen in which the user can choose various global settings to be applied during the operation of the enhanced services application. Settings made via the Write Message screen override a contrary global setting for the subject message. Similarly, the other icons shown in FIG. 12 provide gateways to other corresponding graphical user interfaces for functions corresponding to the name of the icon.

Figure 13:
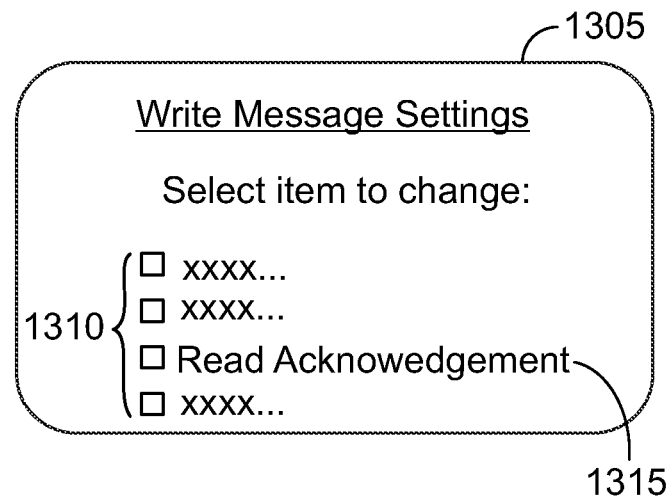
FIG. 13 is an exemplary view of a graphical user interface screen of "Write Message Settings" reached by selecting a "Settings" option available on a Write Message screen accessed from the WRITE icon as shown in FIG. 12.

FIG. 13 shows an exemplary view of a graphical user interface screen 1305 for Write Message Settings. This screen, which can be accessed from the Write Message screen for message composition, allows the originating user to select, i.e. enable, features/commands to be implemented with regard to the subject message. The screen includes a list 1310 of selectable features/commands, where each feature/command includes a checkbox allowing selection of the corresponding feature/command by the user. A Read Acknowledgment feature 1315 along with a corresponding checkbox is provided. Selection of this feature by the originating user will cause a corresponding command to be included with the text message as explained with regard to examples 9 and 10 of FIG. 5.

Figures 14, 15:
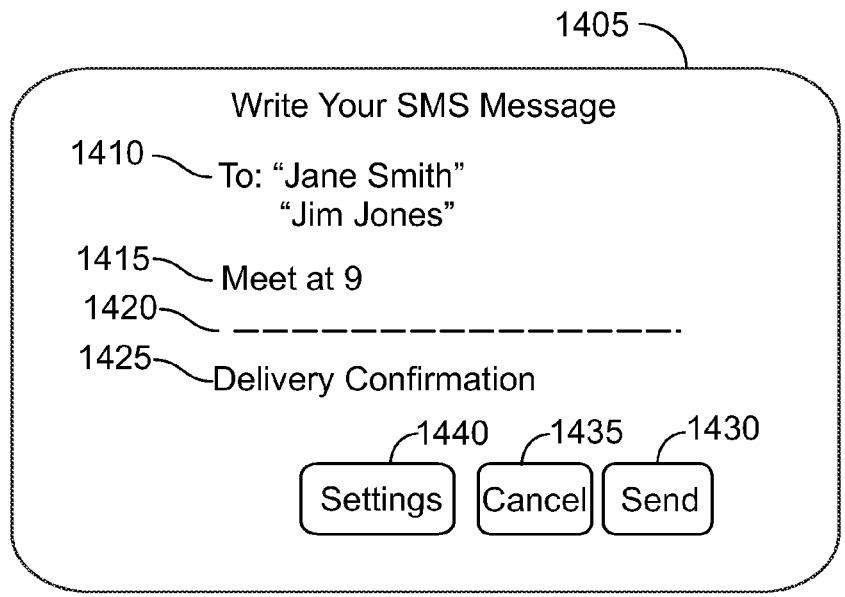
FIG. 14 is an exemplary view of the graphical user interface screen of a Write Message screen showing that delivery confirmation is requested from the addressees.
FIG. 15 is an exemplary view of a Sent Messages screen as seen by the originator of the shown sent messages.

FIG. 14 shows an exemplary view of the graphical user interface screen 1405 of a Write Message screen for message composition. This screen includes a "To" (addressee) field 1410, which in this example, indicates that Jane Smith and Jim Jones will each receive the subject message "Meet at 9" 1415. As will be known to those skilled in the art, the names in the address field will be converted to appropriate corresponding SMS addresses when the corresponding message is transmitted. In this example, a line 1420 below the subject message provides a visual screen separation with items appearing below the line representing commands/features selected to be associated with the transmission of the subject message. In this example, "Delivery Confirmation" 1425 appears below this line indicating that the user has selected the delivery confirmation option to be applied to the message to be sent to the two indicated individuals. A Send button 1430 and a Cancel button 1435 permit the user to cause the subject message with any indicated options to be transmitted to the addressees or to be canceled, respectively. A Settings button 1440 upon selection by the user transfers the user to screen 1305 and permits the selection of various features/commands to be associated with a subject message. In this example two addressees are to receive the subject message and Delivery Confirmation has been elected for each. Because an SMS transmission is primarily a person-to-person based protocol, a first message will be transmitted to Jane Smith with the same text being transmitted as a second message to Jim Jones. Both the first and second messages will contain a delivery confirmation command as explained with regard to FIG. 5.

FIG. 15 shows an exemplary view of an Outbox, i.e. a Sent Messages screen, 1505 which contains a visual listing of messages transmitted from the user's communication device. In the illustrated example, messages 1510, 1515 and 1520 are shown. Each of the messages may contain information separated into various fields. In this example, field 1525 contains information related to the status and/or state of the message; field 1530 identifies the addressee of the message and may contain additional information such as features/commands associated with the subject message; field 1535 contains the date and time of transmission of the message. In message 1510, the "U" in field 1525 indicates that this as an Unread message. "Jane Smith" in field 1530 indicates the addressee and "Delivery Confirmation" indicates that this option was selected for this message. The corresponding date and time of transmission is indicated in field 1535. In this example, the Sent Messages screen 1505 is of the communication device of John Doe, the originator of the shown messages. Message 1515 shows similar information about the message sent to Jim Jones.

Figure 16:
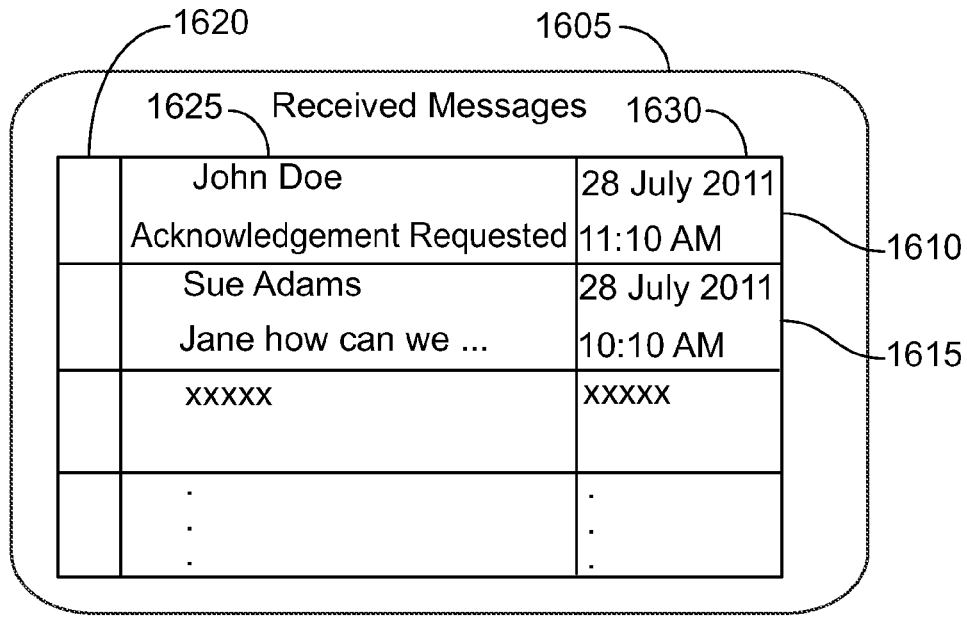
FIG. 16 is an exemplary view of a graphical user interface screen of a Received Messages screen as seen on user's device that has received the shown messages.

FIG. 16 shows an exemplary view of a graphical user interface screen 1605 of a summary listing of Received Messages, i.e. Inbox, of Jane Smith's device. Exemplary received messages 1610 and 1615 each include fields 1620, 1625 and 1630 which generally correspond to the fields 1525, 1530 and 1535, respectively, in terms of function. Message 1610 was received from John Smith, i.e. the reception of message 1510, and indicates in field 1625 that an Acknowledgement Request has been made by the originator. It will be noted with regard to message 1610 in field 1625 that the originator is identified as "John Doe" but that the information below the originator identification shows only "Acknowledgment Requested". This indicates that deliver confirmation has been requested by the originator of the corresponding message and that the recipient has not authorized transmission of an acknowledgment. For received messages that did not request delivery confirmation and for received messages that requested delivery confirmation for which an acknowledgment has been authorized, the information below the originator identification displays a beginning portion of the subject user message, e.g. "Jane, how can we . . . " as shown for message 1615. Thus, upon the user of Jane Smith's device authorizing the transmission of an acknowledgment to John Doe's device with regard message 1610, the user will then be provided access to the corresponding message sent by John Doe. Further, upon returning to the summary listing of Received Messages, the user of Jane Smith's device would see that the field 1625 of message 1610 has changed, i.e. "Acknowledgment Requested" has been removed and in its place the beginning portion of the corresponding user message is displayed. Therefore, in accordance with one embodiment of the present invention, no portion of a user message subject to a delivery confirmation, for which an acknowledgment has not been authorized, is displayed or otherwise made known to the recipient. As shown in FIG. 16, message 1610 provides a notice to the recipient of the originator of the received message and of the date/time of the message, but no information is provided concerning the user text information associated with this message.

Figure 17:
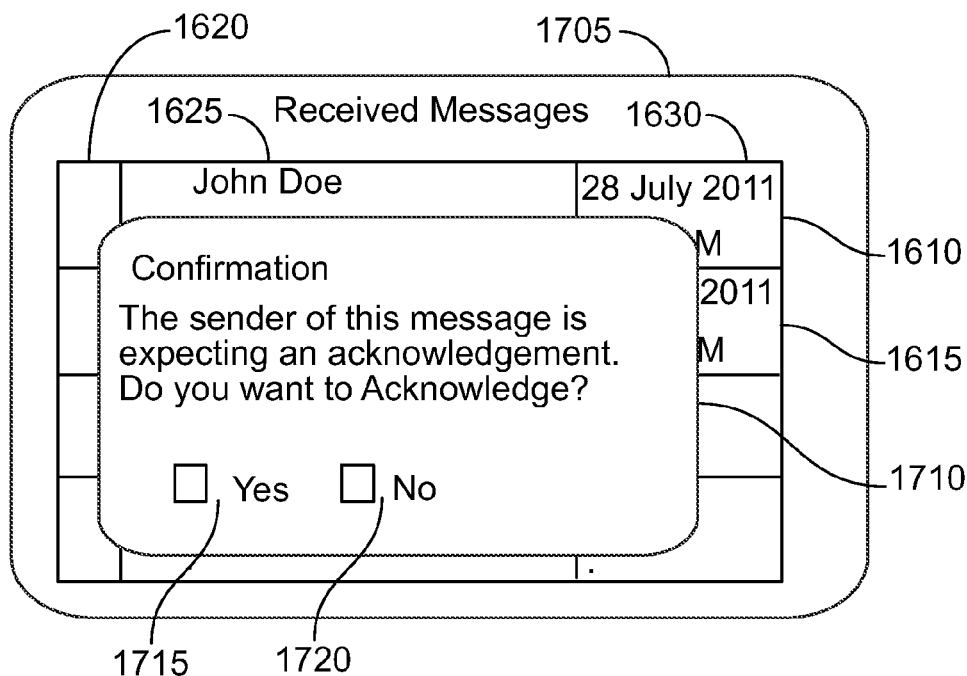
FIG. 17 is an exemplary view of a graphical user interface screen of a Received Messages screen as seen on user's device upon attempted opening of a message for which delivery confirmation is requested but not previously authorized.

FIG. 17 shows another exemplary view of a graphical user interface screen 1705 of Received Messages, i.e. Inbox, of Jane Smith's device. In this view a pop-up window 1710 appears which was caused by the user of Jane Smith's device selecting and attempting to open/view message 1610. The pop-up window appears since the message 1610 includes an Acknowledgement Request by John Doe and the recipient has not yet authorized the acknowledgement. The window advises that the sender has requested an acknowledgement and inquires whether an acknowledgement is authorized by a YES checkbox 1715 or a NO checkbox 1720. Selecting a NO response causes: the pop-up window to close; an acknowledgement message to John Doe not to be sent; and the contents of the message 1610 remain inaccessible/not viewable. Selecting a YES response causes: the pop-up window to close; an acknowledgement message to John Doe to be sent; and the contents of the message 1610 to open, i.e. become accessible/viewable. Once an acknowledgement message to John Doe has been sent, this event is stored in memory of the receiving device in association with the corresponding message and subsequent attempts to open/view the received message are permitted without restraint.

Figure 18:
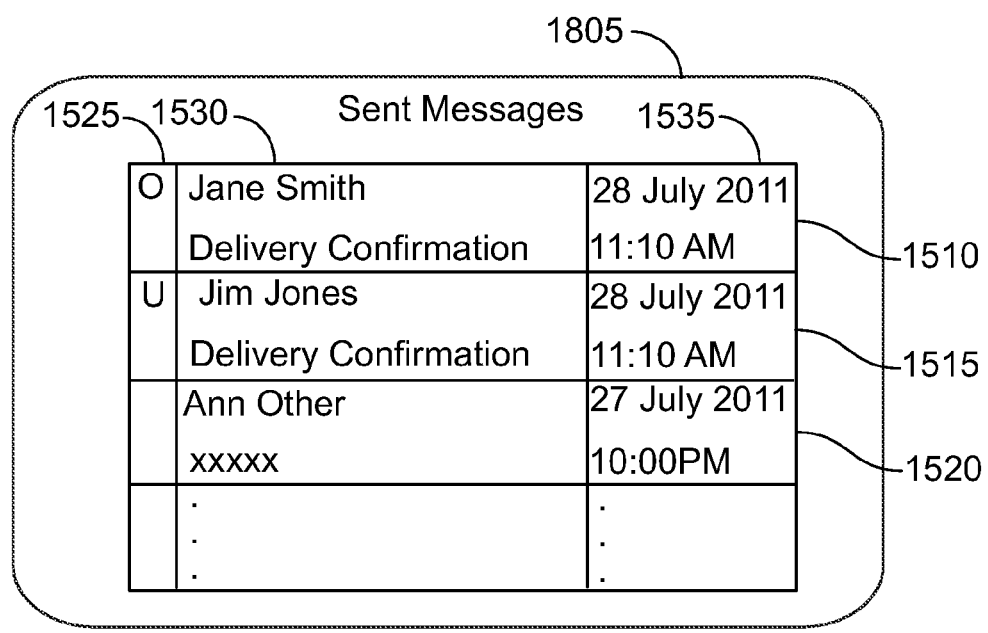
FIG. 18 is an exemplary view of a Sent Messages screen as seen by the originator of the shown sent messages following receipt of confirmation of the first shown message.

FIG. 18 shows another exemplary view of a graphical user interface screen 1805 of Sent Messages, i.e. Outbox, of John Doe's device. Screen 1805 is the same as screen 1505 except that for sent message 1510 the field 1525 now shows "O" in screen 1805 compared with "U" in screen 1505. The "O" (for Opened) means that an acknowledge message (a command only message) from the recipient of the corresponding message has been received by the originator per the latter's request. The receipt of the command acknowledge message by John Doe's device is limited to cause only the explained change in field 1525 of the corresponding message, i.e. the command acknowledge message is not treated as a new message from Jane Smith and is not entered as a received message in the Received Message (Inbox) log of John Doe's device. Thus, for sent messages with Delivery Confirmation requested, the originator can from the information in field 1525 determine whether the recipient of corresponding messages has authorized the sending of an acknowledgement command message, and has likely opened the subject message. Also valuable information is obtained about those messages with a "U" in field 1525, i.e. the originator knows that the recipient does not know the contents of the subject message since the recipient cannot open/view the message contents without having authorized the sending of a corresponding acknowledgement command message.

In accordance with a preferred embodiment of the present invention, the particular encryption utilized to encrypt the user data segment, except for the first 4 bytes that identify the module of the enhanced services application to the used, may be determined by the message priority selected. Different types of encryption may include different encryption/decryption algorithms and/or different encryption/decryption keys, or both. Additional information with regard to the selection of the encryption/decryption utilized based on the priority value is provided with regard to FIG. 11. Upon the selection of the global default priority or a different priority for a particular message, the priority for the subject message is stored, either as a value or color. Upon the user initiating the transmission of the message, the stored priority to be used for the message will be used as an index to identify a corresponding record (see FIG. 11) in a plurality of stored records, where the corresponding record defines an associated color, priority value and specification of the encryption/decryption algorithm and/or encryption/decryption key to be utilized. The module of the enhanced services application prepares the message for transmission, wherein the specified encryption/decryption algorithm and/or encryption/decryption key is utilized to encode the user message, and preferably all of the user data segment except for the first 4 bytes. Once the encryption has been performed, the user data segment is assembled with a corresponding header and transmitted using the selected higher layer data transport format.

Processing a request for an acknowledgment receipt presents additional challenges for email communications as compared to SMS messages. An SMS message is typically directed to a particular user device, e.g. a telephone number associated with a particular telephone of the destination user. Even though the originator of an SMS message may include multiple addressees for a message, the SMS messages are processed as if the originator had composed the same message and sent it individually to each of the addressees, where each is normally associated with a particular device. In the case of an SMS message sent to multiple devices where the message includes a request for an acknowledgment receipt in accord with an embodiment of the present invention, the acknowledgment receipt can be processed by each of the destination devices on a one-to-one basis between each destination device and the originating device.

However, the processing of a request for an acknowledgment receipt of an email communication in accord with an embodiment of the present invention is complicated by the fact that a web-based email account of a user, e.g. Gmail, Hotmail, Yahoo, etc., is accessible by the user via any communication device with Internet access. A user may have a plurality of communication devices, each having an ES application program, that are each used at different times to access his web-based email account. If the user receives an email using a first communication device that includes a request for an acknowledgment receipt in accordance with an embodiment of the present invention and the user agrees to provide the acknowledgment receipt to the originator, it would be annoying if not confusing to the user to have to again agree to provide another acknowledgment receipt upon later attempting to read the same email message from the same email account using a second communication device.

Such a situation would occur if the respective enhanced services application programs on each of the user devices operated independent of the status of messages as determined at the other user devices. For example, after previously agreeing to the acknowledgment receipt request on the first communication device, the enhanced services application program on the first device would store information indicating compliance with the acknowledgment receipt request and would not again prompt the user for an acknowledgment receipt authorization when the user at a later time attempts to read the corresponding web-based email message on the same device.

However, if the user at a later time utilized a second communication device with an installed enhanced services application program to read messages on the same email account, upon attempting to read the email message to which an acknowledgment receipt had been generated by the first communication device, the second communication device not having access to information stored on the first communication device would again prompt the user for authorization to send an acknowledgment receipt before permitting the subject message content to be read on the second communication device.

One possible solution would be to utilize a capability, if available, of the web-based email server to recognize and store information at the server indicative of the status of authorization requests. Regardless of the communication device used to access the user's email messages from the same email server, once an email message had authorization given to respond to an acknowledgment request, this information could be stored at the server such as by a value associated with a flag in a predetermined field of the header of the associated email message. Hence, upon a later access by the user to the same email account at the server using a different communication device, the enhanced services application program on the user's device could read the flag value associated with a subject email, e.g. flag value stored in the email message header as sent from the server, and based on the flag value, could recognize that the acknowledgment request associated with the subject message had been previously complied with and would not again prompt the user for such an authorization upon the user's attempted reading of the subject message. Unfortunately not all email server application programs allow user control to set an appropriate flag that can be used to convey information concerning the status of acknowledgment requests for corresponding email messages.

Another solution to this problem in accordance with an embodiment of the present invention is provided by the enhanced services application programs that reside in end-user communication devices without requiring support, as explained above, from the email server. In general, this technique causes the user device, in which authorization is initially given to comply with an acknowledgment receipt associated with a first received email, to automatically generate a first command email sent to the email originator and a second command email sent to the addressee's same email account, i.e. an email sent to oneself where the addressee address is the same as the recipient's address. The second command email contains: a request for an acknowledgment receipt, origination address and addressee address being the same, i.e. the email recipient's address, and the same unique message reference identification number as contained in the received email that had requested the conformation receipt. This second command email will be received by all user devices that download/read email from the same email account. As will be explained in more detail below, receipt of the second command email is processed by the enhanced services application program resident in the end-user devices that are used to read email from the subject email account. Receipt of the second command email causes the automatic updating of the status of an acknowledgment receipt request for the subject email message, thereby preventing a display of a user prompt for an authorization of an acknowledgment request upon reading of the subject email at the device that received the corresponding command email. Preferably, the generation of this second command email and the processing of its receipt by the enhanced services application program of end-user communication devices occurs as background processing by the enhanced services application program, i.e. background processing meaning that such actions do not require any initiation or interaction by the user and are preferably performed without any intended display to the user that the processing is occurring.

A further issue exists with regard to how to convey to the originator of an email with multiple email addresses/recipients which of the addressees have complied with an acknowledgment receipt request. In accordance with an embodiment of the present invention, different symbols, such as associated with a summary display of the transmitted email, indicates to the email originator the receipt status as among the multiple addressees. A first displayed symbol, e.g. "U" for unread/unopened, associated with an outbox summary of the transmitted email on the originator's email device indicates that none of the addressees have complied with the acknowledgment receipt request; a second displayed symbol, e.g. "U*", indicates that at least one but not all of the addressees of the subject email have not complied with the acknowledgment receipt request; a third displayed symbol, e.g. "O" for opened, indicates that all addressees of the subject email have complied with the acknowledgment receipt request. Further, a log is maintained for each addressee and is displayable to the email originator indicating for each addressee if a reply to the acknowledgment receipt request has been received. This will be explained in more detail below.

Figure 19:
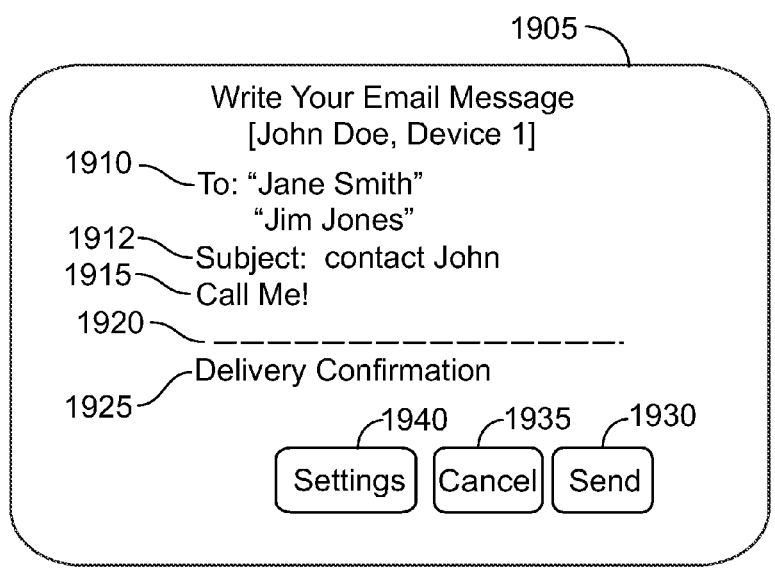
FIG. 19 is an exemplary view of the graphical user interface screen of an email Write Message screen showing that delivery confirmation is requested from the addressees.

FIG. 19 shows an exemplary view of the graphical user interface screen, in accordance with an embodiment of the enhanced services application program, e.g. Walnut, of an email Write Message screen 1905 on an end-user communication device 1 of the email originator showing that delivery confirmation is requested from the addressees. Field 1910 identifies the addressees, Jane Smith and Jim Jones, selected by the email originator. It will be understood that each displayed name is linked to an actual corresponding email address such as stored in the originator's Contacts listing. Field 1912 contains a Subject, e.g. "contact John", entered by the email originator and field 1915 contains the body of the email, e.g. "Call Me!". Line 1920 provides a visual demarcation ending the body of the email section. Field 1925 provides a visual confirmation to the originator that delivery confirmation is to be requested for the subject email. The selection by the user to request delivery confirmation may be made by the originator in a substantially identical matter as explained previously with regard to FIGS. 12 and 13. The selection of delivery confirmation may be set as a global parameter so that by default all created e-mails will initially have request delivery confirmation selected or a request for delivery confirmation may be set on a message by message basis during the creation of the subject new message. Delivery confirmation may be toggled ON and OFF by the user by going to the settings menu via Settings button 1940. The email message is transmitted by the user selection of SEND button 1930, or may be canceled by the user selection of Cancel button 1935. In this illustrative example it will be noted that the user has requested delivery confirmation and that the email has two addressees, i.e. delivery confirmation will be requested from each addressee.

Figure 20:
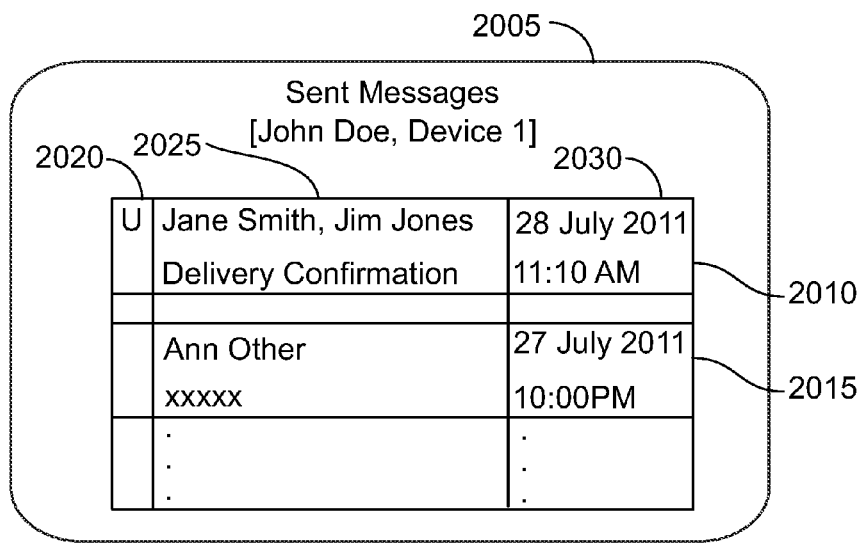
FIG. 20 is an exemplary view of an email Sent Messages screen as seen by the originator of the shown sent messages.

FIG. 20 shows an exemplary view of an email Sent Messages screen 2005 as see on device 1 of the email originator in accordance with an embodiment of the Walnut enhanced services application program. Row 2010 of the illustrated listing of transmitted e-mails corresponds to the transmission of the email described with regard to FIG. 19. Row 2015 and below rows correspond to previously transmitted e-mails. Field 2020 provides the originator with the current status of the delivery confirmation request. In this example, the "U" indicates that a reply to the delivery confirmation has not been received from any of the addressees. As explained elsewhere, other symbols in field 2020 represent the receipt of delivery confirmation from some but not all of the addressees, and the receipt of delivery confirmation from all of the addressees. Field 2025 provides a summary with regard to the subject transmitted email, e.g. identifying the addressees and that delivery confirmation has been requested. Field 2030 shows the date and time of email transmission. In this illustrative example, device 1 of the email originator, John Doe, is device 106C as seen in FIG. 1; devices 2 and 3 of email addressee, Jane Smith, are devices 108B and 108C, respectively; and end-user device 108A is used by email addressee, Jim Jones.

Figure 21:
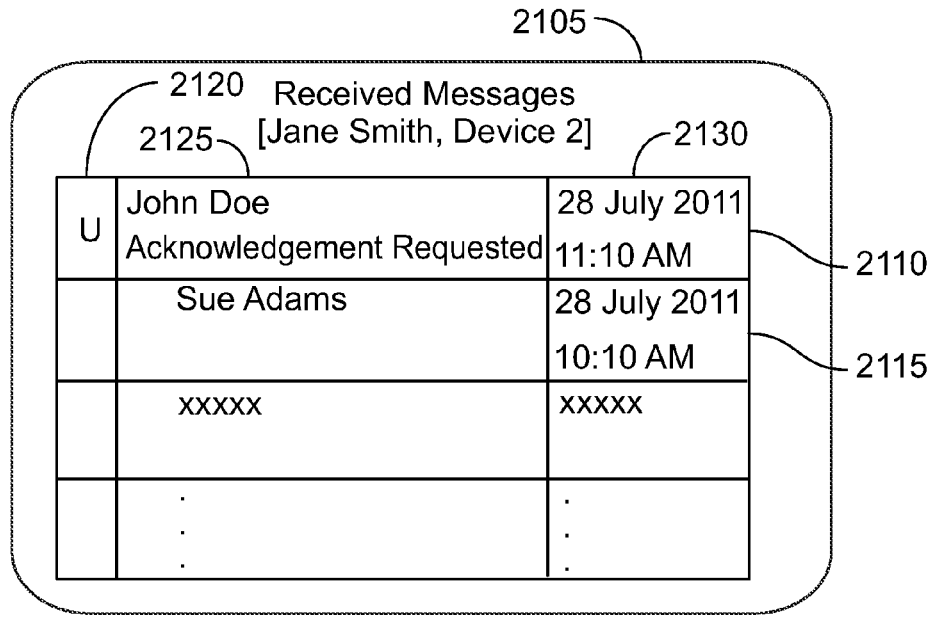
FIG. 21 is an exemplary view of a graphical user interface screen of an email Received Messages screen as seen on user's device that has received the shown messages.

FIG. 21 shows an exemplary view of a graphical user interface Received Messages screen 2105 as seen on device 2 of addressee, Jane Smith, in accordance with an embodiment of the enhanced services application program. Row 2110 shows a summary of the received email message from John Doe. Row 2115 and subsequent rows illustrate other received e-mails. Column 2120 indicates the read/opened, e.g. "O", or unread/unopened, i.e. "U", status of the corresponding email. Field 2125 provides a summary of the received message and may include, for example, identification of the email originator and an indication of whether acknowledgment delivery has been requested. Column 2130 indicates the date and time of message receipt. In this example, the "U" in column 2120 for message 2110 indicates that the received message has not been read or open by the recipient, and "Acknowledgment Requested" indicates that the message originator has requested delivery confirmation for the subject email message.

Figure 22:
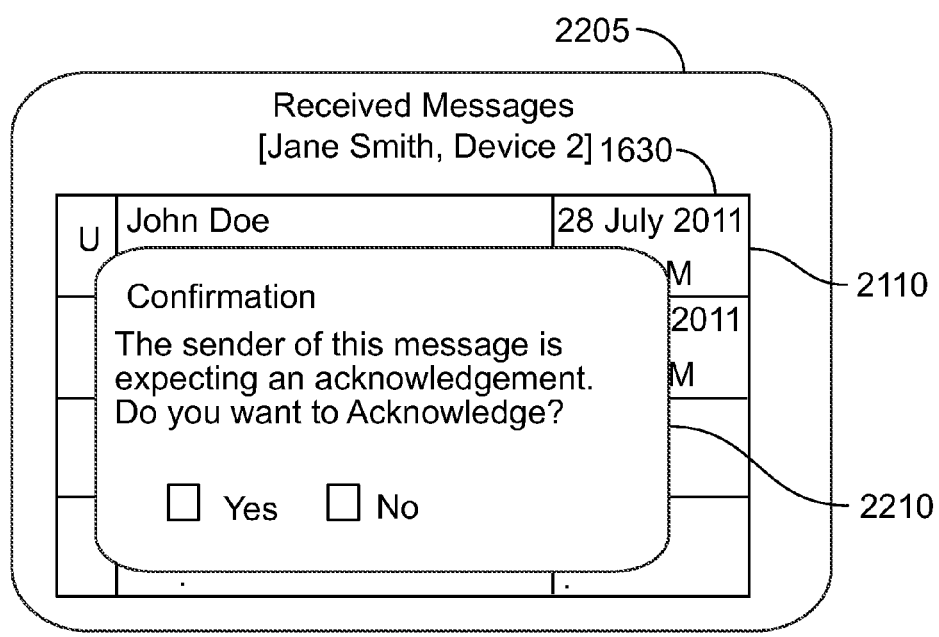
FIG. 22 is an exemplary view of a graphical user interface screen of an email Received Messages screen as seen on user's device upon attempted opening of an email message for which delivery confirmation is requested and not previously authorized.

FIG. 22 shows an exemplary view of a graphical user interface Received Messages screen 2205 as seen on device 2 of addressee, Jane Smith, in accordance with an embodiment of the enhanced services application program upon the addressee making an open/read message input. Upon the addressee's initial attempt to open/read the email message, which includes a delivery confirmation request, indicated by 2110, a pop-up window 2210 is presented advising that a delivery confirmation request has been made by the originator and requesting whether the addressee authorizes the requested acknowledgment. Upon authorization by the addressee, i.e. "Yes" selection, the pop-up window 2210 is closed, command message(s) associated with the delivery confirmation are automatically generated and transmitted, and the content of the subject email message is presented on the screen of the addressee for viewing. If the addressee declines authorization, i.e. "No", the pop-up window 2210 is closed, no command messages associated with the delivery confirmation are generated, and the screen of the addressee returns to the summary view 2105 of received messages with the content of email message 2110 not being displayed nor accessible to the addressee. Thus, in order for an addressee to view the contents of an email message subject to a delivery acknowledgment request, it is mandatory that the addressee authorize delivery confirmation.

FIG. 23 is an exemplary view of an email Sent Messages screen 2305 as seen by the originator of sent messages following receipt of a command message indicating acknowledgement confirmation from an addressee of the message in row 2110. The screen 2305 in FIG. 23 is substantially identical to the previously shown screen 2105 in FIG. 21 except that the symbol shown in column 2120 corresponding to row 2110 is now "U*" instead of "U". In screen 2305, the "U*" symbol indicates that a command message acknowledging delivery confirmation has been received from at least one but not all of the indicated addressees of the subject email message. The change of symbol results from the receipt of the command message from device 2 of Jane Smith.

FIG. 24 is similar to FIG. 23 except that the email originator has requested the display of a log view, as shown in pop-up window 2410, with more details concerning acknowledgement receipt replies. The log view maybe requested by a predetermined user input, e.g. selecting and clicking on the subject email message summary. The log view displays whether a command message, indicating authorization by the addressee of the acknowledgement request for the subject message, has been received for each addressee. This informs the email originator of which addresses have opened the subject email.

Figure 25:
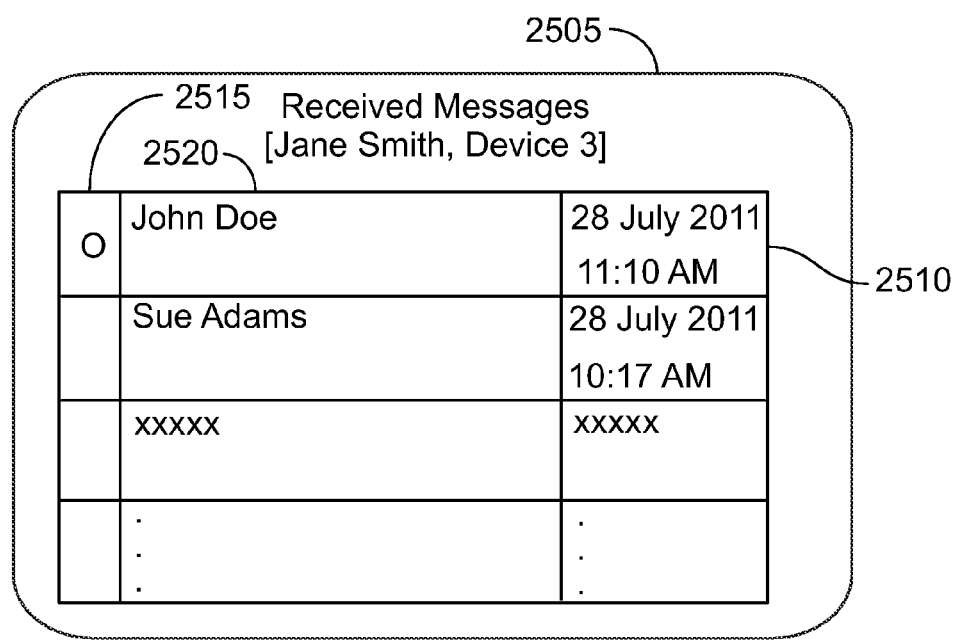
FIG. 25 is an exemplary view of a graphical user interface screen of an email Received Messages screen as seen on another device of an addressee.

FIG. 25 shows an exemplary view of a graphical user interface screen 2505 of an email Received Messages screen as seen on device 3 of addressee, Jane Smith, in accordance with an embodiment of the enhanced services application program. A received message from John Doe is shown in road 2510 with the corresponding column 2515 indicating the read status, column 2520 indicating a message summary and called 2525 indicating the date and time. In accordance with this scenario, Jane Smith has previously utilized a different communication device 2, e.g. wireless mobile unit 108B, to read email from a first email account to which the subject email from John Doe was addressed. As explained with regard to FIG. 22, Jane Smith authorized the acknowledgment request sought by the email originator before being allowed to open and access the contents of the subject email from communication device 2. As will be explained in more detail below, this authorization also caused communication device 2 to automatically generate and transmit an additional self-addressed command message. Upon later utilizing communication device 3, e.g. laptop 108C connected by ethernet cable to Internet access, to access the server that supports the first email account, communication device 3 will download all of the email messages that have not been previously read by the communication device 3. This will include the email 2110 from John Doe and the self-addressed command message generated by communication device 2. Without having received the self-addressed command message, the enhanced services application program would have displayed a "U" in column 2515 for message 2510 and would have displayed a pop-up authorization acknowledgment window upon an attempted opening of the email on communication device 3. However, the enhanced services application program interprets receipt of the self-addressed command message as will be explained in more detail below as an indication to set the corresponding initial read status of the associated email message to "O" on device 3 such that the user may open and read the contents of the subject email on device 3 without a pop-up authorization window being displayed.

FIGS. 26, 27, 28 and 29 are flow diagrams of an exemplary method for processing delivery acknowledgment requests in accordance with an embodiment of an enhanced services application program accordance with the present invention. The steps further explain a technique consistent with the user screens previously described with regard to FIGS. 19-25.

Figure 26:
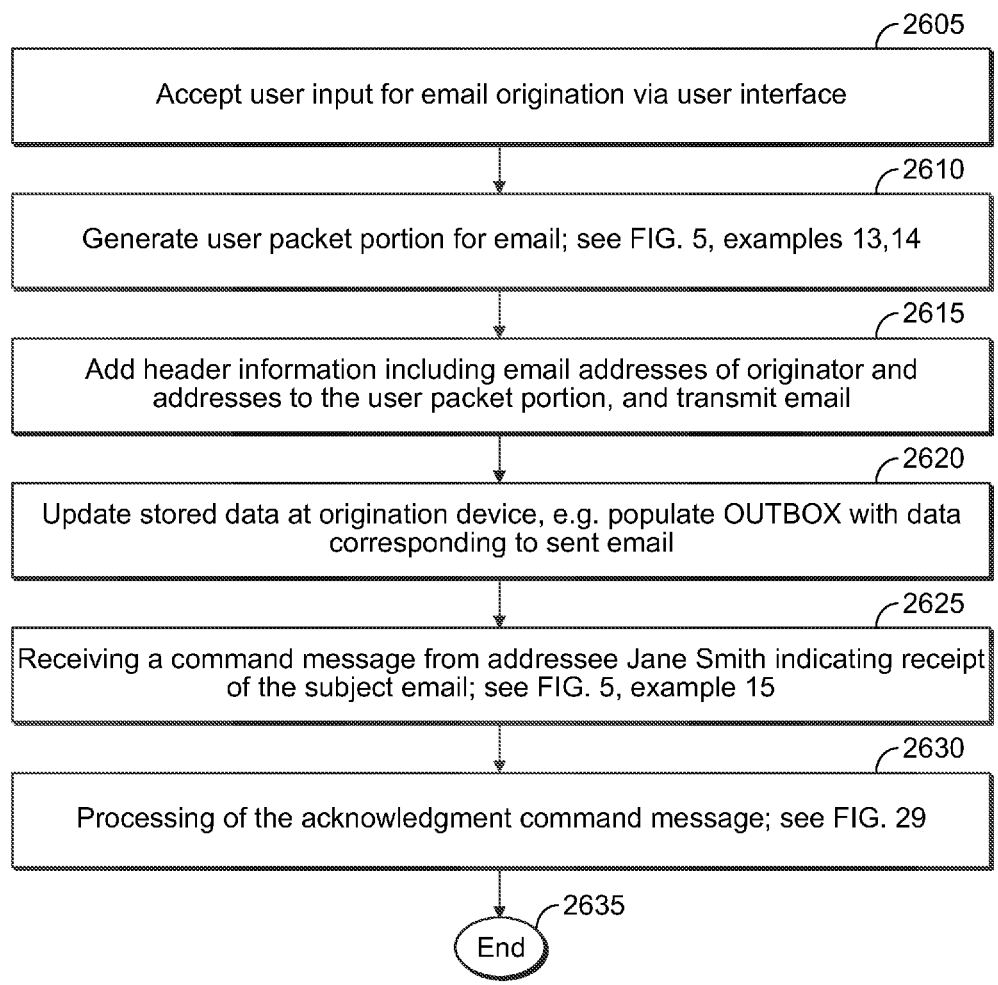
FIG. 26 is a flow diagram of a method practiced by a communication device that processes email origination in accordance with an enhanced services embodiment of the present invention.

FIG. 26 is a flow diagram of an exemplary method practiced by a communication device that originates email in accordance with an enhanced services embodiment of the present invention. As an example consistent with FIGS. 19 and 20, assume that device 1 John Doe is originating the email of 2010. In accordance with step 2605 user input is accepted for email origination by a user interface, e.g. see FIG. 19. In accordance with step 2610 enhanced services application program generates a user packet portion for the subject email; see FIG. 5, examples 13, 14. To form a completed packet of the email ready for transmission in accordance step 2615, header information including the email addresses of the originator and addressees is added to the user packet portion. In this example the originator address will be an email address of John Doe and the addressees will include an email address for Jane Smith and Jim Jones. In step 2620 data stored at the origination device is updated by populating the OUTBOX with data for the corresponding sent email; see 2010 of FIG. 20. In step 2625 a command message is received from device 2 of addressee Jane Smith indicating receipt of the subject email; see FIG. 5, example 15. This command message is received at the device that originated the subject email and processed as a background message, i.e. there is preferably no intended alert provided to the user of the receipt of the command message. However, upon processing the acknowledgment command message by the originating email device, as explained with regard to FIG. 29, the read/opened status field corresponding to the associated email message and the corresponding log information is updated at the origination device. This terminates processing of the illustrative example is indicated by END 2635.

Figure 27:
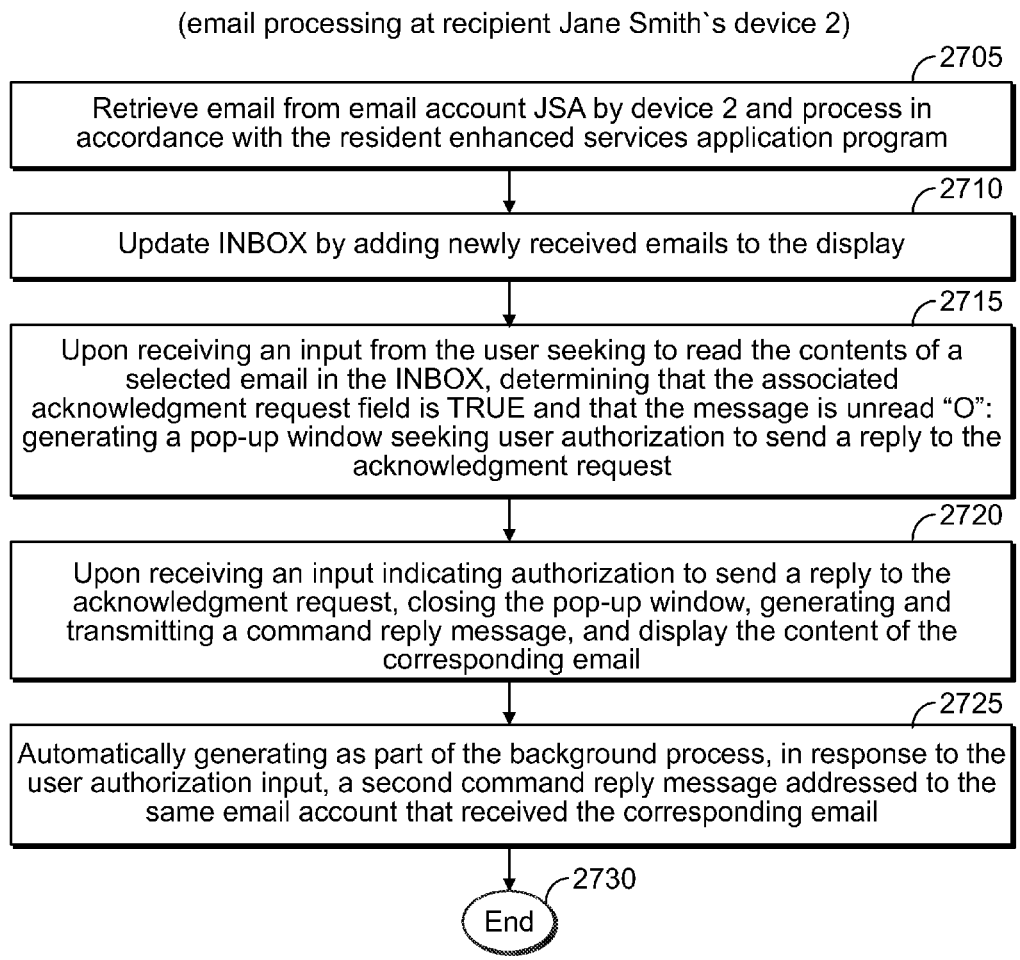
FIG. 27 is a flow diagram of a method practiced by a communication device that processes the receipt of email messages in accordance with an enhanced services embodiment of the present invention.

FIG. 27 shows a flow diagram of an exemplary method practiced by a communication device that receives an email message in accordance with an enhanced services embodiment of the present invention. As an example consistent with the receipt of the subject email message from John Doe by Jane Smith's device 2, in step 2705 email from email account JSA (an email account of Jane Smith) is retrieved by Jane Smith's device 2 for processing in accordance with the resident enhanced services application program. Upon downloading e-mails not previously received by device 2, step 2710 updates the INBOX to display a summary of email that includes the newly retrieved e-mails. In step 2715 input is provided by the user seeking to read the contents of subject received email from John Doe. Enhanced services application program determines that the associated acknowledgment request field of this email message is true, i.e. indicating that an acknowledgment has been requested by the originator, and that the subject email message is unread as denoted by a "U" in the read/open status field. Without permitting access to the contents of the email message, a pop-up window seeking user authorization to send a reply to the acknowledgment request is generated. In step 2720 input from the user is received indicating authorization to send a reply to the acknowledgment request. This causes the pop-up window to close and automatically causes degeneration and transmission of the corresponding command reply message to the originator. The content of the corresponding email message is then displayed to the user. In step 2725 in response to receiving the user authorization input, a self-addressed second command reply message is automatically generated and transmitted as part of the background process. The second command reply message is addressed to Jane Smith at the same email account JSA through which the subject email was received so that the routing header of the second command reply message will contain an originator email address and an addressee email address that are the same. Processing of the illustrative example terminates at END 2730.

Figure 28:
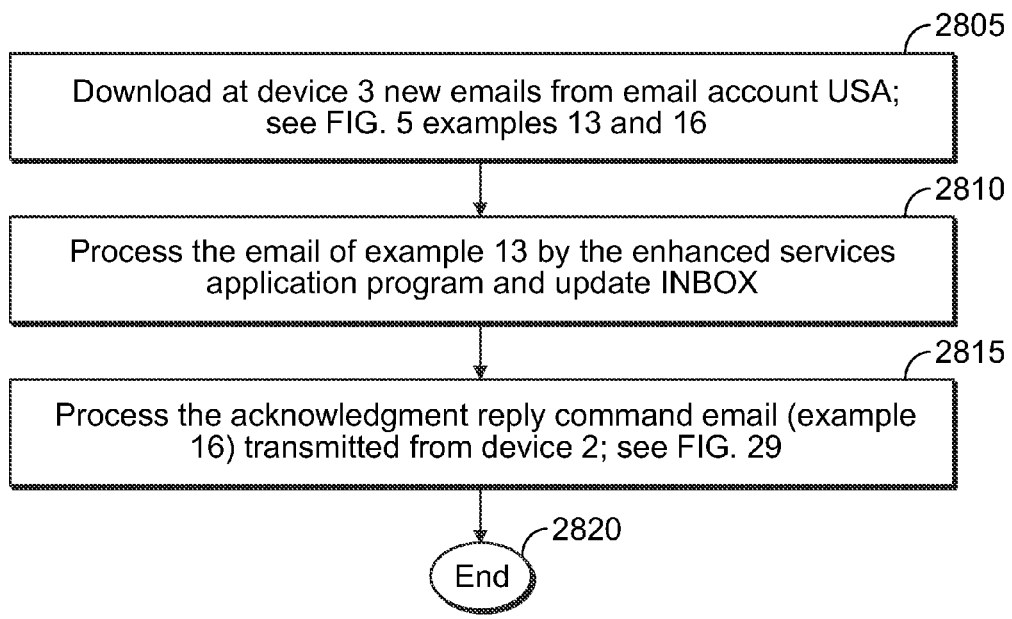
FIG. 28 is a flow diagram of a method practiced by an alternate communication device of the user that processes the receipt of email messages in accordance with an enhanced services embodiment of the present invention.

FIG. 28 is a flow diagram of an exemplary method practiced by communication device 3 of the Jane Smith that processes the receipt of email messages in accordance with an enhanced services embodiment of the present invention. In accordance with the illustrative example, in step 2805 communication device 3 of Jane Smith downloads e-mails not previously received by that device from email account JSA; see FIG. 5 examples 13 and 16. These new e-mails may include conventional e-mails from other users as well as command messages in accordance with the enhanced services application program addressed to this communication device. In step 2810 the received email indicated by example 13 of FIG. 5, i.e. the email originated from John Doe, this process by the enhanced services application program which causes the INBOX to be updated to reflect a summary the receipt of the subject email. In step 2815 the command email (see FIG. 5, example 16) transmitted from Jane Smith's communication device 2 indicating delivery acknowledgment of the subject email from John Doe is processed by the enhanced services application program. This processing at device 3 causes the read/open status field associated with the received email from John Doe to be updated from "U" to "O", where "O" signifies that the message has been previously read/opened. Even though the downloaded email message from John Doe by Jane Smith's communication device 3 is new from perspective of communication device 3, the corresponding read/open status field is updated by the corresponding downloaded command message to correctly reflect that the subject email message has been previously read/opened by Jane Smith. Thus, even if Jane Smith seeks to read the email message from John Doe on communication device 3, contents of the subject email message will be displayed without the display of a corresponding pop-up window seeking authorization to send an acknowledgment reply to the message originator. Processing of the subject sample terminates at END 2820.

Figure 29:
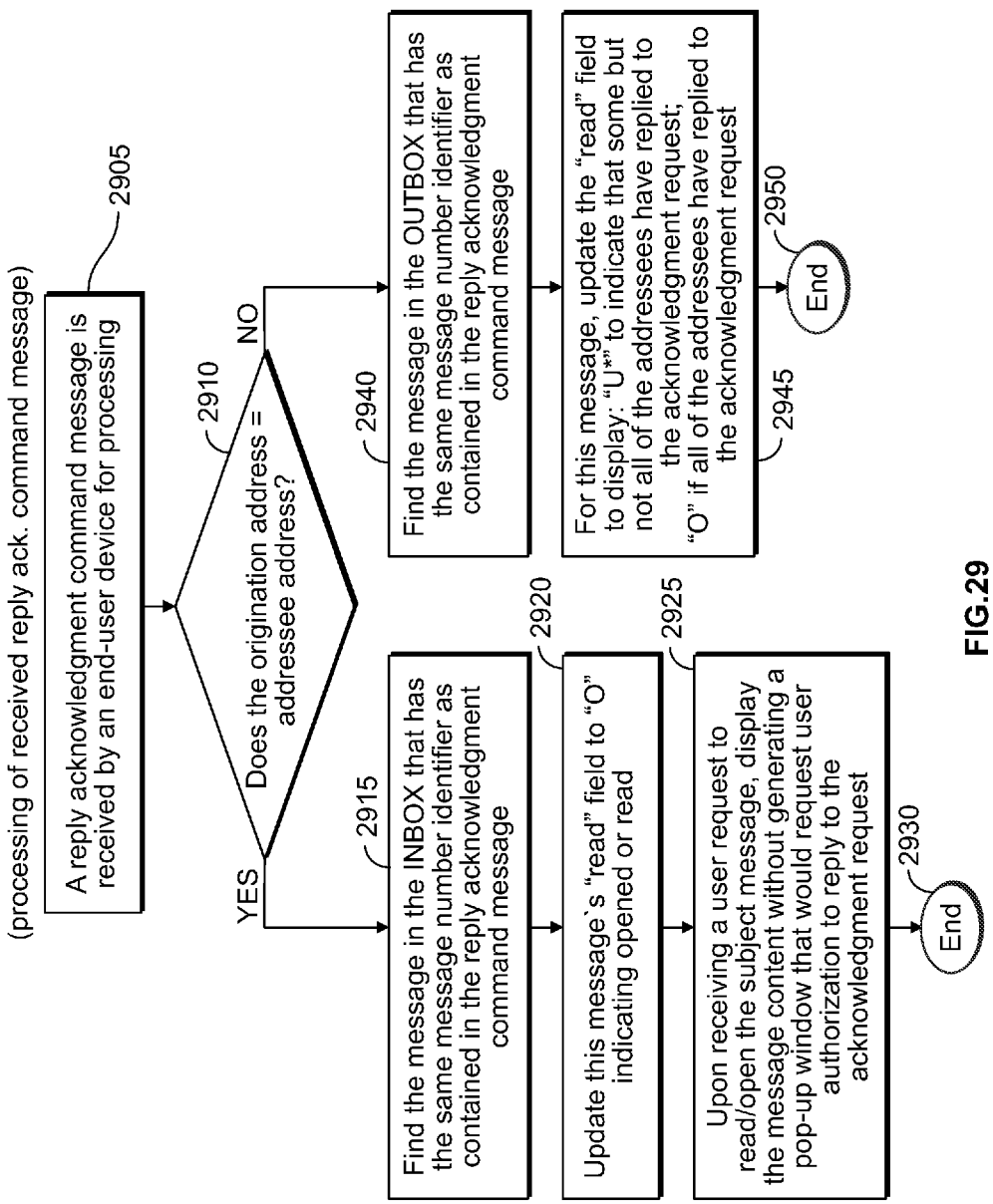
FIG. 29 is a flow diagram of a method practiced by a communication device that processes the receipt of replies to acknowledgement requests associated with email messages in accordance with an enhanced services embodiment of the present invention.

FIG. 29 shows a flow diagram of an exemplary method practiced by a communication device for processing the receipt of command messages indicating acknowledgement delivery in accordance with an enhanced services embodiment of the present invention. In accordance with the illustrative example this flow diagram shows steps for processing the receipt of command messages indicating an acknowledgment reply. In step 2905 a reply acknowledgment command message is received by the end-user device for processing by the enhanced services application program in accordance with an embodiment of the present invention. In step 2910 a determination is made of whether the command message contains an origination address that the same as the addressee address. A YES determination means that the command message was self-addressed and is intended to be used by other communication devices of the same end-user to correctly identify the corresponding email message as having been previously read/open by the end-user. In step 2915 the email message in the INBOX that has the same unique message number identifier as contained in the reply acknowledgment command message is located. Upon the generation of a reply acknowledgement command message, the end-user device inserts the same unique message number identifier in the command message as was associated with the corresponding received email message to which the command message is a reply. In step 2920 the corresponding email message's read/opened status field at the subject end-user device is updated to "O". In step 2925 upon receiving a user request to read/open the subject message the message content is displayed without generating a pop-up window that would request the user to authorize a reply to the acknowledgment request made by the message originator. This exemplary processing by another communication device of the addressee terminates at END 2930.

A NO determination by step 2910 means that the command message is being received by the end-user device of the email message originator. For example, the origination address in the command message will be that of an addressee of the subject email and the addressee address will be that of the subject email originator. In step 2940 the message stored in the OUTBOX of the email message originator's communication device will be located that has the same message number identifier as contained in the reply acknowledgment command message. In step 2945 the read/opened status field for this summary message in the OUTBOX will be updated to display an appropriate symbol, either "U*" to indicate that some but not all of the addressees have replied to the acknowledgment request, or "O" to indicate that all of the addressees have replied to the acknowledgment request. Also the log information stored in originator's communication device will be updated to indicate that the addressee from whom the command message was received has replied to the delivery confirmation request. This terminates processing at END 2950.

With regard to the automatic generation of a self-addressed second command reply message at step 2725, an alternative embodiment would include a prior step of determining whether the addressee utilizes other communication devices with the enhanced services application program to read email from the subject email account. If the addressee only uses one communication device on which the subject email was received to access e-mails from the subject email account, then the transmission of the self-addressed second command reply message could be omitted since its purpose is to inform the enhanced services application program resident on other communication devices that the user has already read subject email message. For such an alternate embodiment, information as to whether the user will employ other communication devices to read the same email account can be stored in the device as a variable that will be checked prior to the execution step 2725. Alternatively, this information can be obtained from the user on a message by message basis such as by expanding the information sought by the pop-up window 2210. That is, the pop-up window could solicit from the user two different types of "YES" inputs: one input being "YES, only this communication device is used to access email from this account."; the other input being "YES, other communication devices may be used to access email from this account." Selection of the first input would cause the generation of the self-addressed second command message to be omitted, while selection of the other input would cause the generation transmission of the self-addressed second command message. The benefit of querying the user and obtaining such information would be the potential elimination of the transmission of a second command message and its associated processing where the addressee only uses one communication device to access email from the particular email account.

The communication device in one example employs one or more computer-readable signal-bearing tangible media. The computer-readable signal-bearing tangible media store software, firmware and/or assembly language for performing one or more portions of one or more embodiments of the invention. The computer-readable signal-bearing tangible medium may contain stored data in the form of magnetic, electrical, optical, biological, and atomic information. For example, the computer-readable signal-bearing tangible medium comprise floppy disks, magnetic tapes, CD-ROMs, DVD-ROMs, hard disk drives, and electronic memory.

Although exemplary implementations of the invention have been depicted and described in detail herein, it will be apparent to those skilled in the art that various modifications, additions, substitutions, and the like can be made without departing from the spirit of the invention. The above illustrated examples of delivery confirmation and its attributes apply equally for other formats of communications. That is, a delivery confirmation request utilized in these other formats will generate the same or substantially similar actions. For example, an e-mail using a user segment as described that is sent to a plurality of recipients with a delivery confirmation request will be processed by a corresponding enhanced services application at each recipient device as described above. Thus, each e-mail recipient must authorize the transmission of an acknowledgment to the originator as a condition precedent to the corresponding user message in the e-mail being displayed. Various types of techniques can be utilized to generate a unique message identifier. If desired, a limited portion of a received message having a delivery confirmation request could be displayed to the recipient even though the recipient had not authorized the transmission of an acknowledgment, e.g. a first few characters or words in the message could be displayed, or an associated subject line could be displayed. With regard to the command structure of the illustrated messaging format, different characters or symbols can be used to define corresponding actions/events, and different sequencing, positions or numbers of bytes can be used to convey information. Although it was described that the transmission of the command message conveying a response to the delivery confirmation request be completed prior to access being provided to the addressee of the content of the subject email, access to the addressee the content of the subject email could be provided in response to authorization of the acknowledgment reply command message even if the transmission of the command message had to be delayed such as when access to the supporting communication link was not available at the time of authorization.

The scope of the invention is defined in the following claims.

We claim:

1. A method implemented by a first end-user communication device for processing emails in which acknowledgement of receipt by an addressee of an email is requested by an originator of the email, the method comprising:
generating, by the first end-user communication device, the email comprising a digital packet having a header segment and a user data segment, the user data segment containing a user message and a command portion;
inserting an acknowledgement request in a command field in the command portion wherein the addressee device upon receipt thereof executes predetermined steps associated with the acknowledgement request; and
transmitting the digital packet for delivery to the addressee device, and wherein the digital packet is transmitted by using either simple mail transfer protocol or hypertext transfer protocol for delivery of the email to the addressee device.

2. The method of claim 1 further comprising:
the command portion includes a first indicator having a value that defines whether the user message has been viewed by the addressee and a message identifier that is assigned to said email;
storing the user data segment in memory of the first end-user communication device;
receiving by the first end-user communication device from the addressee device a reply email containing a command message acknowledging receipt of said email where the command message includes the same message identifier as contained in the email to which the command message was sent as a reply;
identifying the user data segment stored in the first end-user communication device to which the command message was sent based at least in part on the message identifier;
in response to receipt of the command message, storing a value of the first indicator that represents acknowledgement by the addressee device of receipt of the corresponding user message.

3. The method of claim 2 further comprising:
prior to receipt by the first end-user communication device of the command message, the first indicator having a value that represents that the corresponding user message had not been viewed at the addressee device;
displaying at least some information of said sent email message on a screen of the first end-user communication device, a symbol representative of the value of the first indicator being displayed as part of the at least some information so that the user of the first end-user communication device is provided with visual indication by the symbol of whether the addressee has viewed the associated email.

4. The method of claim 1 further comprising:
the first end-user communication device transmitting said email to a plurality of addressees in which acknowledgement of receipt is requested so that each addressee device is requested to send a command message acknowledging receipt of said email to the first end-user communication device;
determining by the first end-user communication device which of the addressees have viewed the associated email based on receipt of a reply email containing a command message from corresponding addressee devices;
displaying at least some information of said sent email message on a screen of the first end-user communication device, a symbol representative of the status of the receipt of command messages from corresponding addressee devices being displayed as part of the at least some information so that the user of the first end-user communication device is provided with visual indication by the symbol of said status.

5. The method of claim 4 wherein one symbol represents that a command message has been received from none of said addressees and another symbol represents that command messages have been received from all of said addressees.

6. The method of claim 4 wherein the step of determining comprises:

receiving from a first addressee a first command message by the first end-user communication device;

upon determining that the address of the device that sent the email containing the first command message is not the address of the first addressee to which said email was sent, and upon determining that a first sent email contained in storage of the first end-user communication device has a message identifier that matches the message identifier contained in the received first command message, storing data in memory of the first end-user communication device representing that the first addressee has acknowledged receipt of the subject email.

7. A computer program product, comprising a non-transitory computer medium having a computer readable program code embodied therein, said computer readable program code adapted to be executed by an end-user communication device to implement a method for generating an email communication, the method comprising:

generating, by the first end-user communication device, the email comprising a digital packet having a header segment and a user data segment, the user data segment containing a user message and a command portion;

inserting an acknowledgement request in a command field in the command portion wherein the addressee device upon receipt thereof executes predetermined steps associated with the acknowledgement request; and transmitting the digital packet for delivery to the addressee device, and wherein the digital packet is transmitted by using either simple mail transfer protocol or hypertext transfer protocol for delivery of the email to the addressee device.

8. The computer program product of claim 7 further comprising:

the command portion includes a first indicator having a value that defines whether the user message has been viewed by the addressee and a message identifier that is assigned to said email;

storing the user data segment in memory of the first end-user communication device;

receiving by the first end-user communication device from the addressee device a reply email containing a command message acknowledging receipt of said email where the command message includes the same message identifier as contained in the email to which the command message was sent as a reply;

identifying the user data segment stored in the first end-user communication device to which the command message was sent based at least in part on the message identifier;

in response to receipt of the command message, storing a value of the first indicator that represents acknowledgement by the addressee device of receipt of the corresponding user message.

9. The computer program product of claim 8 further comprising:

prior to receipt by the first end-user communication device of the command message, the first indicator having a value that represents that the corresponding user message had not been viewed at the addressee device;

displaying at least some information of said sent email message on a screen of the first end-user communication device, a symbol representative of the value of the first indicator being displayed as part of the at least some information so that the user of the first end-user communication device is provided with visual indication by the symbol of whether the addressee has viewed the associated email.

10. The computer program product of claim 7 further comprising:

transmitting said email to a plurality of addressees in which acknowledgement of receipt is requested so that each addressee device is requested to send a command message acknowledging receipt of said email to the first end-user communication device;

determining by the first end-user communication device which of the addressees have viewed the associated email based on receipt of a reply email containing a command message from corresponding addressee devices;

displaying at least some information of said sent email message on a screen of the first end-user communication device, a symbol representative of the status of the receipt of command messages from corresponding addressee devices being displayed as part of the at least some information so that the user of the first end-user communication device is provided with visual indication by the symbol of said status.

11. The computer program product of claim 10 wherein one symbol represents that a command message has been received from none of said addressees and another symbol represents that command messages have been received from all of said addressees.

12. The computer program product of claim 10 wherein the step of determining comprises:

receiving from a first addressee a first command message by the first end-user communication device;

upon determining that the address of the device that sent the email containing the first command message is not the address of the first addressee to which said email was sent, and upon determining that a first sent email contained in storage of the first end-user communication device has a message identifier that matches the message identifier contained in the received first command message, storing data in memory of the first end-user communication device representing that the first addressee has acknowledged receipt of the subject email.

13. An end-user communication device that generates an email communication, the device comprising:

a microprocessor controlled apparatus receives user input to create information to be conveyed by an email communication;

the microprocessor controlled apparatus generates an email comprising a digital packet having a header segment and a user data segment, the user data segment containing a user message and a command portion;

the microprocessor controlled apparatus inserts an acknowledgement request in a command field in the command portion wherein the addressee device upon receipt thereof executes predetermined steps associated with the acknowledgement request; and the microprocessor controlled apparatus causes the transmission of the digital packet for delivery to the addressee's device, and wherein the digital packet is transmitted by using either simple mail transfer protocol or hypertext transfer protocol for delivery of the email to the addressee device.

14. The end-user communication device of claim 13 wherein the command portion includes a first indicator having a value that defines whether the user message has been viewed by the addressee and a message identifier that is assigned to said email, the end-user communication device comprising:

memory in which is stored the user data segment;

the microprocessor controlled apparatus receiving from the addressee device a reply email containing a command message acknowledging receipt of said email where the command message includes the same message identifier as contained in the email to which the command message was sent as a reply;

the microprocessor controlled apparatus identifying the user data segment stored in the end-user communication device to which the command message was sent based at least in part on the message identifier;

a screen for displaying information;

the microprocessor controlled apparatus storing a value of the first indicator that represents acknowledgement by the addressee device of receipt of the corresponding user message and causing a representation of said value to be displayed on the screen in association with at least some information about the corresponding sent email.

15. The end-user communication device of claim 14 further comprising:

prior to receipt by the end-user communication device of the command message, the first indicator having a value that represents that the corresponding user message had not been viewed at the addressee device;

the microprocessor controlled apparatus causing the display of at least some information of said sent email message on the screen of the end-user communication device, a symbol representative of the value of the first indicator being displayed as part of the at least some information so that the user of the end-user communication device is provided with visual indication by the symbol of whether the addressee has viewed the associated email.

16. The end-user communication device of claim 13 further comprising:

the microprocessor controlled apparatus causing the transmission said email to a plurality of addressees in which acknowledgement of receipt is requested so that each addressee device is requested to send a command message acknowledging receipt of said email to the end-user communication device;

the microprocessor controlled apparatus determining which of the addressees have viewed the associated email based on receipt of a reply email containing a command message from corresponding addressee devices;

the microprocessor controlled apparatus causing the display of at least some information of said sent email message on a screen of the end-user communication device, a symbol representative of the status of the receipt of command messages from corresponding addressee devices being displayed as part of the at least some information so that the user of the end-user communication device is provided with visual indication by the symbol of said status.

17. The end-user communication device of claim 16 wherein one symbol represents that a command message has been received from none of said addressees and another symbol represents that command messages have been received from all of said addressees.

18. The end-user communication device of claim 16 wherein the microprocessor controlled apparatus determining comprises:

the microprocessor controlled apparatus receiving from a first addressee a first command message by the end-user communication device;

upon the microprocessor controlled apparatus determining that the address of the device that sent the email containing the first command message is not the address of the addressee to which said email was sent, and upon the microprocessor controlled apparatus determining that a first sent email contained in storage of the end-user communication device has a message identifier that matches the message identifier contained in the received first command message, the microprocessor controlled apparatus storing data in memory of the end-user communication device representing that the first addressee has acknowledged receipt of the subject email.

\* \* \* \* \*